United States Patent
Treadgold et al.

(10) Patent No.: US 7,231,343 B1
(45) Date of Patent: Jun. 12, 2007

(54) SYNONYMS MECHANISM FOR NATURAL LANGUAGE SYSTEMS

(75) Inventors: Nicholas K. Treadgold, San Jose, CA (US); Babak Hodjat, Santa Clara, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 956 days.

(21) Appl. No.: 10/326,492

(22) Filed: Dec. 20, 2002

Related U.S. Application Data

(60) Provisional application No. 60/342,237, filed on Dec. 20, 2001, provisional application No. 60/342,230, filed on Dec. 20, 2001.

(51) Int. Cl.
*G06F 17/27* (2006.01)

(52) U.S. Cl. .............................. 704/9; 707/5; 709/202

(58) Field of Classification Search ..................... None
See application file for complete search history.

(56) References Cited

U.S. PATENT DOCUMENTS

| | | | | |
|---|---|---|---|---|
| 4,270,182 | A * | 5/1981 | Asija | 704/8 |
| 5,007,019 | A | 4/1991 | Squillante et al. | |
| 5,197,005 | A | 3/1993 | Shwartz et al. | |
| 5,255,386 | A | 10/1993 | Prager | |
| 5,555,169 | A * | 9/1996 | Namba et al. | 704/9 |
| 5,634,051 | A * | 5/1997 | Thomson | 707/5 |
| 5,682,539 | A | 10/1997 | Conrad et al. | |
| 5,721,903 | A | 2/1998 | Anand et al. | |
| 5,734,897 | A | 3/1998 | Banks | |
| 5,890,146 | A | 3/1999 | Wavish et al. | |
| 5,909,678 | A | 6/1999 | Bergman et al. | |
| 5,974,413 | A | 10/1999 | Beauregard et al. | |
| 6,006,225 | A | 12/1999 | Bowman et al. | |
| 6,029,165 | A | 2/2000 | Gable | |
| 6,076,051 | A * | 6/2000 | Messerly et al. | 704/9 |

(Continued)

FOREIGN PATENT DOCUMENTS

JP 9-113299 5/1997

(Continued)

OTHER PUBLICATIONS

Rankin, Paul J., "Context-Aware Mobile Phones: The difference between pull and push, Restoring the importance of place," Human Computer Interaction International (HCII'01) Aug. 4-10, 2001, New Orleans, Louisiana, USA.

(Continued)

*Primary Examiner*—Donald L. Storm
(74) *Attorney, Agent, or Firm*—Haynes Beffel & Wolfeld LLP

(57) ABSTRACT

Roughly described, a natural language interface to a back-end application incorporates synonyms automatically added to user input to enhance the natural language interpretation. Synonyms can be learned from user input and written into a synonyms database. Their selection can be based on tokens identified in user input. Natural language interpretation can be performed by agents arranged in a network, which parse the user input in a distributed manner. In an embodiment, a particular agent of the natural language interpreter receives a first message that includes the user input, returns a message claiming at least a portion of the user input, and subsequently receives a second message delegating actuation of at least that portion to the particular agent.

28 Claims, 13 Drawing Sheets

U.S. PATENT DOCUMENTS

| | | | |
|---|---|---|---|
| 6,144,989 A | 11/2000 | Hodjat et al. | |
| 6,243,459 B1 | 6/2001 | Treadgold et al. | |
| 6,260,059 B1 | 7/2001 | Ueno et al. | |
| 6,292,767 B1 | 9/2001 | Jackson et al. | |
| 6,304,864 B1 * | 10/2001 | Liddy et al. | 706/15 |
| 6,519,585 B1 | 2/2003 | Kohli | |
| 6,523,172 B1 | 2/2003 | Martinez-Guerra et al. | |
| 6,567,805 B1 | 5/2003 | Johnson et al. | |
| 6,622,119 B1 | 9/2003 | Ramaswamy et al. | |
| 6,675,159 B1 | 1/2004 | Lin et al. | |
| 6,687,689 B1 * | 2/2004 | Fung et al. | 707/3 |
| 6,922,691 B2 * | 7/2005 | Flank | 707/4 |
| 6,965,899 B1 | 11/2005 | Subramaniam et al. | |
| 7,027,975 B1 | 4/2006 | Pazandak et al. | |
| 7,047,253 B1 | 5/2006 | Murthy et al. | |
| 7,092,928 B1 | 8/2006 | Elad et al. | |
| 2002/0032564 A1 * | 3/2002 | Ehsani et al. | 704/235 |
| 2002/0052871 A1 | 5/2002 | Chang et al. | |
| 2002/0059069 A1 | 5/2002 | Hsu et al. | |
| 2002/0069192 A1 | 6/2002 | Aegerter | |
| 2002/0072914 A1 * | 6/2002 | Alshawi et al. | 704/270.1 |
| 2002/0156629 A1 | 10/2002 | Carberry et al. | |
| 2003/0063113 A1 * | 4/2003 | Andrae | 345/700 |
| 2003/0069880 A1 | 4/2003 | Harrison et al. | |
| 2003/0172084 A1 | 9/2003 | Holle | |
| 2004/0049375 A1 | 3/2004 | Brittan et al. | |
| 2005/0246390 A1 | 11/2005 | House et al. | |
| 2006/0168335 A1 | 7/2006 | Hodjat et al. | |

FOREIGN PATENT DOCUMENTS

| | | |
|---|---|---|
| JP | 2000-29585 | 1/2000 |
| JP | 2000-122685 | 4/2000 |
| JP | 2000-259180 | 9/2000 |
| JP | 2000-322088 | 11/2000 |
| JP | 2001-27540 | 1/2001 |
| JP | 2001-216129 | 8/2001 |
| JP | 2002-5680 | 1/2002 |
| JP | 2002-123290 | 4/2002 |
| JP | 2003-5897 | 1/2003 |
| JP | 2004-106797 | 4/2004 |

OTHER PUBLICATIONS

Nuance Communications, Inc., "Developing Flexible Say Anything Grammars Student Guide," Copyright 2001, Nuance Communications, 1005 Hamilton Avenue, Menlo Park, California 94025 USA.

Thomas Kuhme, "Adaptive Action Prompting—A Complementary Aid to Support Task-Oriented Interaction in Explorative User Interfaces", Siemens Corporate Research and Development Otto-Hahn-Ring 6, 8000 Munich 8, Germany, email: kuehme@zfe.siemens.de, 1993.

* cited by examiner

ACTUATION AGENT

SYNONYMS MECHANISM FOR NATURAL LANGUAGE SYSTEMS

CLAIM OF PRIORITY

This application claims the benefit of U.S. Provisional Application Nos. 60/342,230 and 60/342,237, both filed 20 Dec. 2001, and both of which are incorporated herein by reference.

REFERENCE TO COMPUTER PROGRAM LISTING AND TABLE APPENDICES

Computer program listing and Table appendices comprising duplicate copies of a compact disc, named "DEJI 1006-2-CPLA," accompany this application and are incorporated by reference. The appendices include the following files:

| | | | |
|---|---|---|---|
| extractSynonyms.txt | 2 | KBytes | created 11/13/2002 |
| InteractionAgent.java.txt | 13 | KBytes | created 11/13/2002 |
| opal.txt | 279 | KBytes | created 7/15/2002 |
| Proposal.java.txt | 13 | KBytes | created 11/13/2002 |
| ProposalImportance.java.txt | 1 | KBytes | created 11/13/2002 |
| ProposalMatch.java.txt | 8 | KBytes | created 11/13/2002 |
| ProposalTable.java.txt | 10 | KBytes | created 11713/2002 |
| Suggestion.java.txt | 6 | KBytes | created 11/13/2002 |
| SuggestionMatch.java.txt | 13 | KBytes | created 11/13/2002 |
| Suggestions.java.txt | 5 | KBytes | created 11/13/2002 |
| SuggestionTable.java.txt | 10 | KBytes | created 11/13/2002 |
| XMLActuationAgent.java.txt | 13 | KBytes | created 11/13/2002 |

COPYRIGHT DISCLAIMER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

1. Field of the Invention

The invention relates to user-machine interfaces, and more particularly, to techniques for applying synonyms, suggestions and push messages to improve the effectiveness of natural language user interaction with a back end application.

2. Background and Summary of the Invention

U.S. Pat. No. 6,144,989, incorporated by reference herein, describes an adaptive agent oriented software architecture (AAOSA), in which an agent network is developed for the purpose of interpreting user input as commands and inquiries for a back-end application, such as an audiovisual system or a financial reporting system. User input is provided to the natural language interpreter in a predefined format, such as a sequence of tokens, often in the form of text words and other indicators. The interpreter parses the input and attempts to discern from it the user's intent relative to the back-end application. The interpreter sometimes needs to interact with the user in order to make an accurate interpretation, and it can do so by outputting to the user an inquiry or request for clarification. In addition, the back-end application also needs to be able to provide output to the user, such as responses to the user's commands, or other output initiated by the application. AAOSA is one example of a natural language interpreter; another example is Nuance Communications' Nuance Version 8 ("Say Anything") product, described in Nuance Communications, "Developing Flexible Say Anything Grammars, Nuance Speech University Student Guide" (2001), incorporated herein by reference.

Natural language interpreters have become very good at interpreting user's intent in many situations. Most systems rely on some sort of word-spotting algorithm that has been pre-defined by a programmer for the particular back-end application. In some situations, however, the language used by the user might not have been anticipated by the programmer, sometimes resulting either in commands that are either not recognized or recognized incorrectly. If they are not recognized, then the user might experience no response from the system, and if they are recognized incorrectly, then the system might command the back-end application to perform a function different from the user's intent. U.S. Pat. No. 6,144,989, incorporated above, provides some techniques for learning from contradiction resolution and from user dissatisfaction with the results of an interpretation, but additional mechanisms are needed.

Roughly described, the invention addresses the above problems through the formalized use of synonyms and suggestions. Synonyms are learned by the system using an explicit learning mechanism, and suggestions are learned using a form of implicit learning. In addition, many of the mechanisms for implementing suggestions can also be used to implement an adaptive, context-based "push" functionality (sometimes referred to herein as proposals), in which the suggestions are programmed by someone other than the user. In addition, a novel statistics based reinforcement algorithm can be used to improve the accurate selection of suggestions and proposals.

BRIEF DESCRIPTION OF THE DRAWINGS

The invention will be described with respect to particular embodiments thereof, and reference will be made to the drawings, in which.

DETAILED DESCRIPTION

Figure 1:
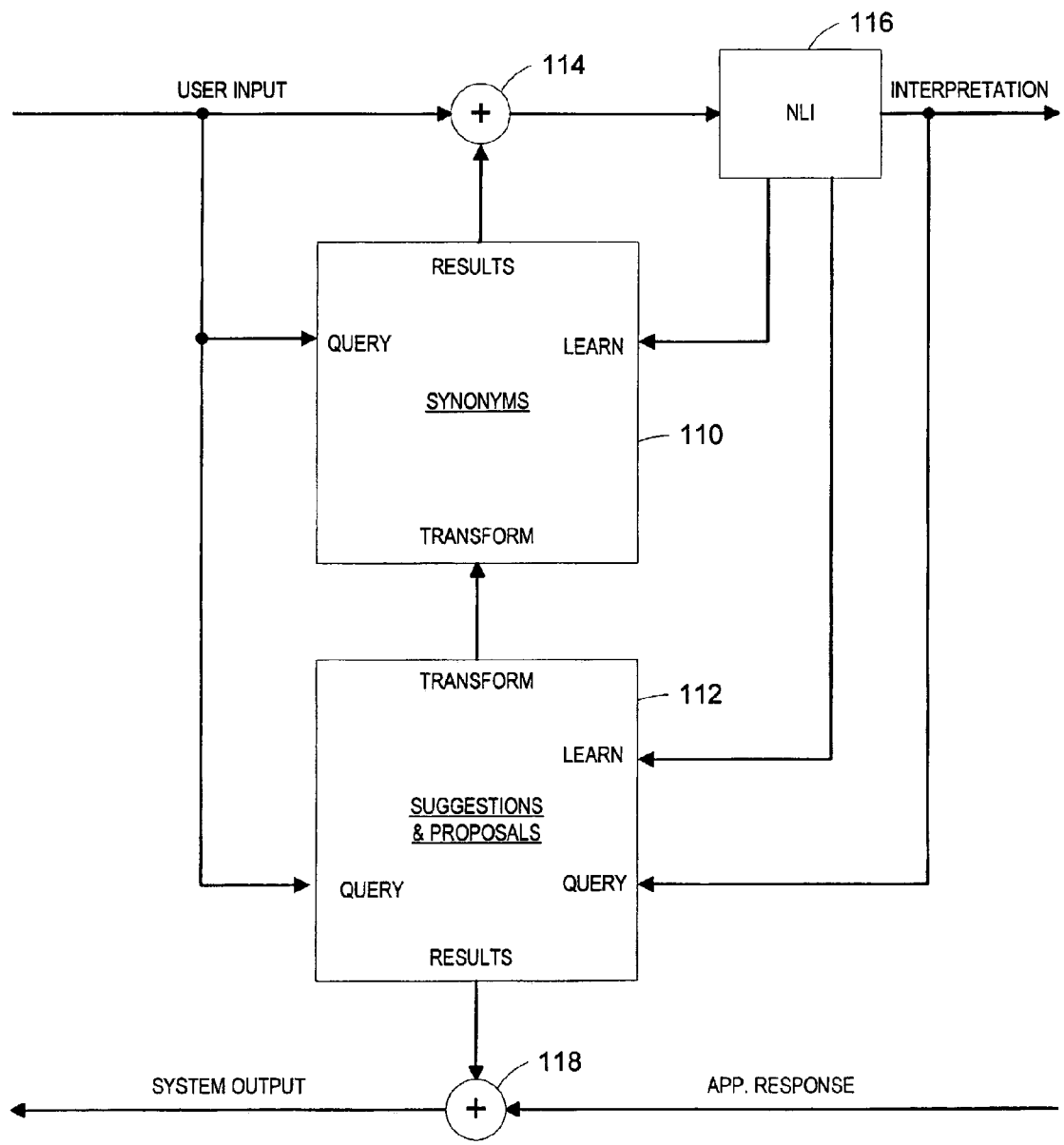
FIGS. 1 and 2 are overviews of systems incorporating the invention.

A suggestion is a piece of information that the system believes to have an association with another piece of information. For example "show me movies around here" may be associated with "Sunnyvale or Mountain View". A suggestion has value in that when it is presented to the user in an appropriate context, it allows the user to clarify a command. This improves the ability of the system to provide an interpretation. Suggestions can be vague, and may or may not be applicable in a given context. Suggestions should be presented to the user for confirmation of correct context.

In an embodiment, suggestions have an importance value attached to them to indicate the degree to which the system believes the two pieces of information are associated. For example, the association between the phrases "around here" and "Sunnyvale or Mountain View" may have a high importance value, while the association between the phrases "groovy movie" and "something with Bruce Willis in it" may have a lower importance value. In an embodiment, the importance value is learned by the system using reinforcement learning. The importance value affects the system's selection of suggestions to present to the user.

One property of suggestions is that in general they must be presented to the user for verification. This is because a suggestion may not be appropriate for a given context. For example, if the system has an association between the phrases "groovy movie" and "something with Bruce Willis in it", and the system automatically appends the second phrase to user input that includes the first phrase, without the user's acknowledgment, then the user would only ever see movies with Bruce Willis in them when requesting a groovy movie. This may often be a valid action. But it also may lead to incorrect interpretations and user confusion ("why do I only get Bruce Willis movies when I ask for groovy movies?")

A "synonym" is a piece of information that means the same thing as something else. As used herein, synonyms represent an exact correspondence, and can automatically replace its matching phrase to aid interpretation. In some embodiments that include agents executing interpretation policies, synonyms common to different users can automatically be added to the appropriate agent policy to increase interpretation efficiency. Synonyms can be considered to be a subset of suggestions, in that a synonym is a suggestion with a maximum confidence value. A synonym can be swapped 'in place' with its matching phrase without changing the meaning of the user command. For example, given that "around here" has the synonym "Sunnyvale or Mountain View", if the user asks "show me movies around here", the system can automatically replace "around here" with "Sunnyvale or Mountain View" when it attempts to interpret the command. This replacement can be done automatically, without the users knowledge. A synonym also can be used as a macro by allowing the user to define a simple phrase to stand for a complex one. For example, the user can create a synonym "chart IBM" equals "chart IBM P/E ratio for the last 3 years".

Proposals are similar to suggestions in that they are pieces of information that the system believes to have an association with another piece of information. They differ from suggestions in that they are programmed by a third party, such as the operator of the system, rather than being learned from interaction with the user. Proposals can be used, for example, in targeted marketing.

As with suggestions, proposals are context-based, and they are adaptive. A proposal is context-based in that the interpretation of the natural language input entered by a user is matched to a database of proposals. Only those proposals that match to a certain degree of confidence are offered to the user. Proposals are adaptive in that they can incorporate a reinforcement learning mechanism that responds to the acceptance or rejection of proposals by a user. This learning mechanism can be made system or user based. Context-based pushing of information is important both for users, who wish to avoid being flooded with irrelevant information, and information providers, who wish to target their audience. Applications for pushing relevant information to users are numerous, and include such domains as cellular phones and Internet sites. One less obvious but no less important application area for proposals is the education of users about the feature space of a natural language system. One problem associated with natural language systems is that since the user often has no visual clues as to what the system is capable of, the user fails to use many of the available system features, or attempts out of bounds functionality. Proposals can be created to recognize these situations and to provide information on the system scope. Thus the push mechanism described herein can be used to present relevant information to the user of a natural language system in response to a user interaction.

As mentioned, proposals are context based in that the interpretation, rather than the input string, is matched. Thus for proposals, the user's intent is compared to the proposal targets. Suggestions do not match on user's intent, but instead match on tokens in the user's natural language input. The reason for this difference is that generally, the reason a user follows up on previous input, is because of dissatisfaction with the system's response to the previous input. The user follows up in order to clarify or refine that response. This indicates that there were probably tokens in the input that the system did not recognize. So by generating the context value based on user input tokens, instead of on the system's interpretation, this information can hopefully be used.

For example:
   User: show me groovy movies
   System: [responds with all movies, because it doesn't know what "groovy" is, and hence does not claim it in the interpretation/actuation].
   User: something with bruce willis in it please
   System: [gives results & creates a new suggestion]

Next interaction:
   User: show me groovy Tom Cruise movies
   System: [returns Tom Cruise movies, and suggests "something with bruce willis in it please" because the groovy token matches, even though the system still cannot interpret "groovy"].

Two drawbacks of suggestions are that it is not always easy to recognize when user input is intended as a follow-up, and it is not always easy to reformat suggestion text (which is in the same form in which it was provided by the user) to display text (which would be more user-friendly). Proposals have neither of these drawbacks, and have the added advantage of being able to calculate context based on the user's interpretation.

Creating Synonyms and Suggestions Through Learning

In the embodiments described herein, synonyms are created through explicit learning, and suggestions are created usually through implicit learning. For example, the following dialogue will result in explicit learning of a synonym:
   User> When I say sports I mean ESPN
   System> OK
   User> Turn to sports
   * The system turns to the ESPN channel.

Explicit learning also allows the user to create macros for commonly used expressions. For example, the following dialogue will result in explicit learning User> In the future chart IBM is the same as chart IBM P/H ratio for the last 3 years
System> OK
User> chart IBM
* The system charts IBM P/E ratio for the last 3 years.

Some of the advantages of explicit learning are that one-shot learning can occur, that unlearning of a synonym can be achieved, and macros can be defined and undefined. Some of the disadvantages of explicit learning are that the user may not bother to instruct the system, the system may not be able to interpret the user's command to learn a synonym, the system may learn a synonym incorrectly, and even though a user defines a synonym, it may not be a true synonym in the grammatical sense, and so in some contexts give confusing or incorrect interpretations. An example of the last point is if the user defines the synonym "around here" to be "Sunnyvale or Mountain View", but the user moves to New York, and asks for movies "around here".

One way to improve the chance that the user takes time to instruct the system is to provide the user with tokens that were not understood by the system and ask for them to be explained. This can be done in when the system totally fails to interpret a command, when the system partially interprets a command, when the system encounters an ambiguity, and when user expresses dissatisfaction. Some examples of these cases are given below.

Synonym learning on failure
User> Turn to sports
System> Sorry, I do not understand. Please explain some terms or rephrase the command (terms not understood: 'sports')
User> Sports is ESPN
* The system turns to ESPN and learns the synonym 'sports' is 'ESPN'.
Synonym learning on partial success
User> Show me all the groovy comedies around here
System> There are 512 comedy movies playing in 2151 theaters. You can narrow down your search entering information on theater location, movie type (terms not understood: 'groovy around here')
User> Around here is Sunnyvale or Mountain View
* The system learns the synonym 'around here' is 'Sunnyvale or Mountain View' and returns a modified movie list.
Synonym learning on ambiguity
User> Turn on the boobtube
System> Do you mean
the TV
the VCR
Ignore input
(terms not understood: 'boobtube')
Users boobtube is TV
* The system learns the synonym 'boobtube' is 'TV', and turns on the TV.

A difficulty with this method might be in the extraction of valuable words as opposed to garbage words. The chance of presenting garbage words could be reduced by firstly removing common and noise words that have been generated using the same corpus that is used to create the natural language interpreter. The system may also learn which words to present by noting user explanations. For example, three words may be unknown and presented to the user for explanation. If the user only explains one, the other two words could be added to a list of possible garbage words, and hence become less likely to be presented to the user again.

When the system fails to extract a synonym from an input, it can then proceed to make it a suggestion. Two cases in which the system will fail to extract a synonym are (1) when the user does not instruct the system, but merely rephrases the command; and (2) when a synonym cannot be extracted from the user explanation with the required degree of confidence. Examples of these two cases are given below.

Suggestion learning on synonym extraction failure
User> Turn to sports
System> Sorry, I do not understand. Please explain some terms or rephrase the command (terms not understood: 'sports')
User> Turn to ESPN
* The system turns to ESPN and learns the suggestion 'Turn to sports' is
'Turn to ESPN'.
Suggestion learning on synonym extraction failure
User> Turn to sports
System> Sorry, I do not understand. Please explain some terms of rephrase the command (terms not understood: 'sports')
User> well . . . dude what I mean . . . turn to well sports is really ESPN I guess try that
* The system turns to ESPN and learns the suggestion 'Turn to sports' is
'well . . . dude what I mean . . . turn to well sports is really ESPN I guess try that'.

In the last example the suggestion learned is a poor one (at best, too verbose), and so it will result in a poor confidence value.

One method that can be used to ensure that the extracted synonyms are what the user intended, is for the system to interact with the user to confirm the correctness of the synonym. If the user does not validate the synonym, a suggestion can be created instead so that no information is lost.

Synonym verification
User> Turn to sports
System> Sorry, I do not understand. Please explain some terms of rephrase the command (terms not understood: 'sports')
User> Sports is ESPN
System> So, 'sports' is the same thing as 'ESPN'?
User> Yes
* The system turns to ESPN and learns the synonym 'sports' is 'ESPN'.
Synonym verification failure
User> Show me all the groovy comedies around here
System> There are 512 comedy movies playing in 2151 theaters. You can narrow down your search entering information on theater location, movie type (terms not understood: 'groovy around here')
User> Around here is Sunnyvale or Mountain View
System> So, 'around here' is the same thing as 'Sunnyvale or Mountain View'
User> Not always, just sometimes
* The system creates the suggestion 'around here' is 'Sunnyvale or
Mountain View' and returns a modified movie list.

Synonyms can be unlearned (or re-learned) when the user presents a new explanation. For example:
User> Turn to sports
*The system turns to ESPN, since it has learned this synonym
User> No, sports is FOX
System> So, 'sports' is now 'FOX'?
User> Yes

* The system turns to FOX and re-learns the synonym 'sports' is 'FOX'.

In addition to learning, synonyms can also be created by transformation from suggestions. Suggestions can either become synonyms directly, or information from a suggestion can be extracted to make a synonym. Both transformations are performed carefully to avoid producing incorrect and confusing future interpretations. One method to perform the transformation is to allow suggestions to become synonyms when they reach a certain confidence value. Another method involves the extraction of a synonym using the correspondence of terms from multiple similar suggestions. In any event, to ensure that a valid synonym is created, the system should preferably interact with the user to request confirmation that the new synonym is correct.

Implementation Overview

FIG. 1 is an overview of a system incorporating the invention. The division of functions among the various blocks shown in the figure is arbitrary, and other embodiments might divide up the functions differently or not at all. Also, whereas this system supports synonyms, suggestions and proposals, another embodiment might support only one or two of such functionalities.

Broadly, the system of FIG. 1 includes a synonyms unit 110, which maintains a database of synonyms, and a suggestions & proposals unit 112, which maintains databases of suggestions and proposals. The databases are preferably maintained on a per-user basis, but that is not necessary in other embodiments. As used herein, the term "database" refers only to a collection of information and associations between such information. The term does not imply any particular structure, or even that the database be unitary in structure. One "database" can include one or more "sub-databases", for example, all of which are themselves considered herein to be "databases". Thus whereas synonyms, suggestions and proposals are all kept in separate structures in the present embodiment, a different embodiment might merge two or all three into a single unitary structure. Other variations of structure will be apparent.

User input arrives into the system in any desired form, such as text typed by the user, or sound samples, or input already partially processed. In the present embodiment the user input arrives in the form of a text string. In general, it can be said that user input arrives as a sequence of one or more "tokens", which can include words, sub-words, punctuation, sounds and/or other speech components. The user input is provided as a query into the synonyms unit 110, which outputs any synonyms that it has for any of the tokens in the user input. These are added to the input token sequence in a node 114. The resulting sequence is provided to a natural language interpreter (NLI) 116 for interpretation. The NLI 116 attempts to discern the user's intent from the user input token sequence, and outputs its resulting interpretation. Often the interpretation is forwarded on toward a back-end application as commands or queries, but in some embodiments and in some situations (such as where the NLI 116 failed to interpret some or all of the input token sequence), transmission toward the back-end application may be withheld. (The terms "command" and "query" are used interchangeably herein.) In addition, both the user input and the interpretation are also often forwarded to the suggestions and proposals unit 112 to identify any suggestions and proposals that might be relevant. Suggestions and proposals are examples of what is sometimes referred to herein as "additional potential input." Note that whereas potential synonyms and suggestions are identified by analysis of the user input, proposals are identified by analysis of the NLI's interpretation of the user input. Any resulting suggestions and proposals identified by the unit 112 are added to any response from the back-end application in a node 118, and forwarded toward the user as system output.

In addition to these functions, the NLI 116 also includes functionality to recognize when the user input is defining a synonym, and to add it to the synonyms database in the synonyms unit 110. The NLI 116 also determines from user input that is a follow-up to prior user input, whether a new suggestion should be created, and/or whether suggestions or proposals pre-existing in the suggestions and proposals databases should be rewarded or punished. This information is forwarded to the suggestions and proposals unit 112 for updating of the databases.

Natural Language Interpreter

The natural language interpreter 116 attempts to discern meaning from the user input token sequence even in the face of partial, unexpected or ungrammatical utterances. It accomplishes this in part by attempting to spot concepts in an incoming token sequence, typically by reference to specific keywords or classes of keywords. Some of the keywords are the concepts themselves (like "Monday" in the phrase, "I'll be there on Monday"), and some of the keywords are indicators of where the concept is likely to appear (like "on" in the same phrase). The NLI 116 can be any of a variety of natural language interpreters, including, for example, Nuance Communications' Nuance Version 8 ("Say Anything") product or a platform containing an AAOSA agent network from Dejima, Inc. In Nuance Version 8, the NLI compares the incoming text string to a natural language understanding (NLU) grammar which has been written by a designer to look for specific keywords. For example, in a natural language interface for an airline reservation system, the NLU grammar might look for words such as "depart", "departing", or "leaving from", followed by a city name. In this case the keywords referenced by the natural language interpreter 116 would include the words "depart", "departing", "leaving", "from", as well as a complete list of city names. The city names are usually represented in a sub-grammar in the NLU. In an AAOSA agent network, agents contain policy conditions which either do or do not apply to the incoming text string, and if they do, they make a claim to at least a portion of the incoming text string. Such claims imply a tentative interpretation of part or all of the input string. For example, an agent network might be designed to include policy conditions to look for any of the words "depart", "departing" or "leaving", earlier in the text string than the word "from", which in turn is earlier in the text string than a city name. In this case as well, the keywords referenced by the natural language interpreter 116 would include the words "depart", "departing", "leaving" and "from", as well as a complete list of city names.

As used herein, "developing" or "attempting" a "natural language interpretation" means discerning or attempting to discern, from user input the user's intent relative to the back-end application. The user's intent may be represented in many different forms, but in the present embodiment the user's intent is represented as an XML string describing generalized commands that the system believes the user intends to apply to the back-end application. Note also that "attempting" a natural language interpretation does not necessarily imply that the attempt fails or fails partially. "Developing" a natural language interpretation, for example, is one of the possible consequences of "attempting" a natural language interpretation.

"Failure" of an attempted natural language interpretation depends on the implementation, but in the present embodiment, failure means that the NLI was unable to discern any intent at all from the user input. "Partial failure" in the present embodiment means that the NLI was able to make an interpretation of one portion of the user's input, but it was unable to make an interpretation of a second portion of the user's input.

AAOSA Implementation Overview

Figure 2:
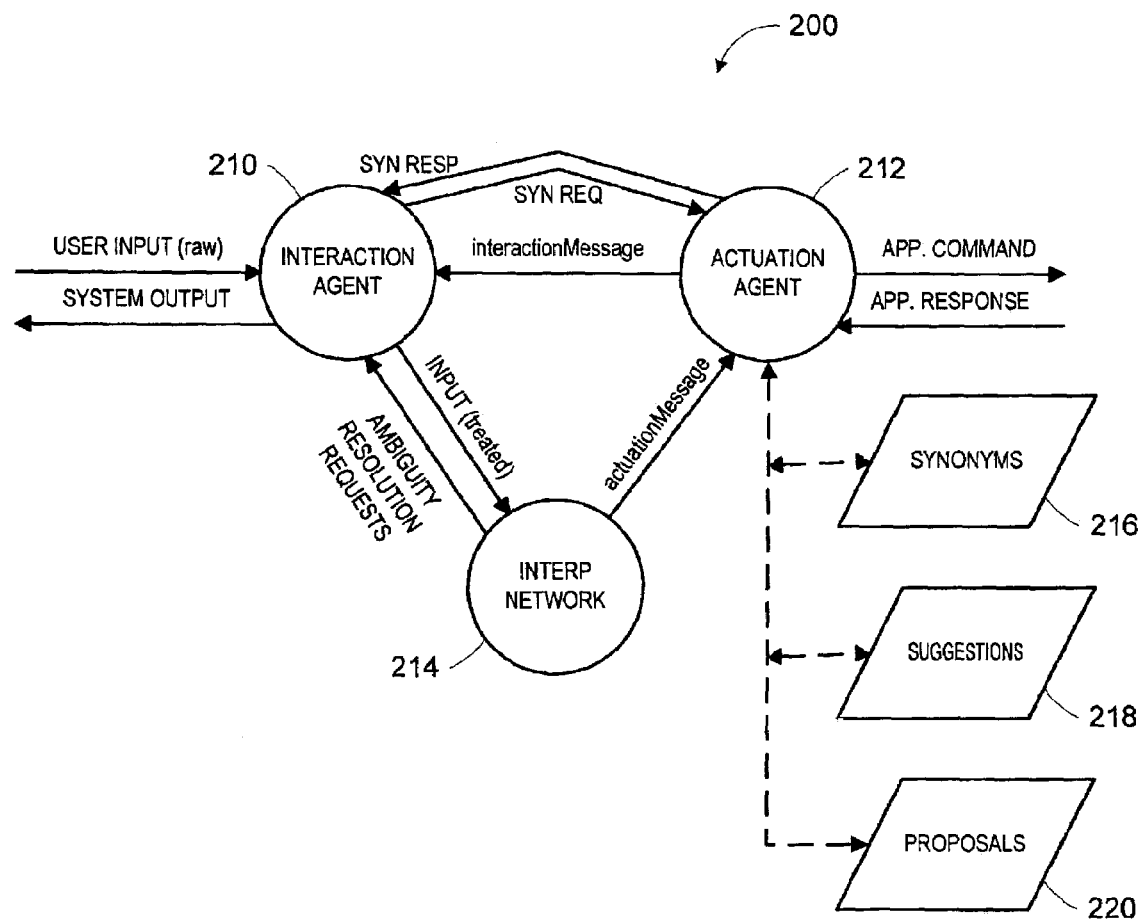

FIG. 2 is an overview diagram of a system 200 which uses an AAOSA-based agent platform to implement the invention. The system 200 includes an interaction agent 210 which controls all communication with the user, an actuation agent 212 which controls all communication with the back-end application, and the natural language interpretation network 214 itself. The three synonyms, suggestions and proposals databases 216, 218 and 220, respectively, are maintained by the actuation agent 212, but one, two or all of them could in a different embodiment be maintained by the interaction agent 212, by an agent or agents in the interpretation network 214, and/or by other components of the system. In the system 200, the "raw" user input (prior to the addition of any synonyms) is received by the interaction agent 210. The interaction agent 210 forwards a copy of the user input string to the actuation agent 212 to request any synonyms. The actuation agent 212 responds with any synonyms found in the synonyms database 216, and the interaction agent 210 adds them to the raw user input and forwards the combination in the form of an interpretation request message to the interpretation network 214. The interpretation network 214 may require clarification of the user's input in certain circumstances, such as in the event of a recognized ambiguity, in which case the interpretation network 214 communicates the clarification requests back to the user via the interaction agent 210. The interpretation network 214 maintains context information so that new token sequences received from the user can be properly interpreted as a response to the agent network's clarification requests. The system recognizes user input as a continuation of prior input either through heuristics (such as by creating policies in the agent network to try to recognize continuations), or by the user explicitly flagging the new input as a continuation (such as by checking a "maintain context" checkbox). Once the interpretation network 214 completes an interpretation of one or more input token sequences, it transmits its interpretation in an "actuation" message to the actuation agent 212. The actuation agent 212 forwards the actuation to the back end application in the form required by the back end application, unless there were no claims made, in which case a "no interpretation" string is sent back to the interaction agent. The interpretation network 214 thus allows the user to interact normally, as if the user is interacting with another human being, and the system 200 interprets the user's intent and generates the specific signals and syntax required by the back end application to effect that intent. If the back end application has a response to the user's inquiry or command, or if it initiates its own interaction with the user, the actuation agent 212 communicates this information in an "interaction" message to the interaction agent 210, which forwards it on to the user in the form required by the user's form of communication. The actuation agent 212 also includes any suggestions and proposals in its interaction message, that match the actuation message with sufficient confidence.

Databases

Before describing the components of the embodiment of FIG. 2 in more detail, it will be useful to define the fields of the various entries in the three databases 216, 218 and 220. The synonyms database 216 contains a plurality of entries, with each entry having at least a "target" field and a "synonym" field. The "target" field contains a token sequence of one or more tokens that can be compared against user input tokens to identify a match. The "synonym" field contains a token sequence of one or more tokens that can be substituted for the token(s) in the input string that match the corresponding target token(s), without changing the user's intent. One target token sequence can appear in more than one entry in the database, for example if it has more than one alternative synonym token sequence. In another embodiment the database contains only unique targets, although synonyms can be repeated. The synonyms will be token strings that the agent network is known to be able to interpret, otherwise there is no point in creating the synonym table entry. This validation can be done in the actuation agent (or wherever the synonym table is stored), for example by comparing the synonym to a list of all known text tokens that can be claimed by the agent network. The synonyms database can be structured as a table, with each entry located on a separate row, preferably ordered from most recent to oldest, but what is important is the association between target token(s) on the one hand and their synonym(s) on the other hand Another example structure, therefore, is a set of linked lists: the first entry in a linked list is a target token sequence, and the second and subsequent entries in the same linked list contains alternative synonym token sequences all associated with the same target token sequence. In an embodiment in which the database can hold more than one synonym for a single target, the placement of new synonyms at the front of the list for existing targets allows "unlearning" to occur if the embodiment is designed to return only the first synonym encountered.

The suggestions database 218 contains a plurality of entries, with each entry having at least a "target" field, a "suggestion" field, and an "importance" field. The target field is similar to the target field in the synonyms database 216. It can be compared against user input tokens to identify a match. The "suggestion" field is a token string that, if offered to and accepted by the user, can be automatically sent into the interpretation network 214 as if it had been input by the user manually. Typically it appears to the interpretation network 214 as follow-up input to prior user input. It is formatted similarly to the format used for user input (or easily convertible to that format), rather than the format used for actuation strings. As with synonyms, the suggestions database 218 can include more than one entry with the same "target" field contents. In this case the suggestions in the suggestions field represent alternative suggestions that the system might offer in response to the same matching user input. The "importance" field contains a value (between 0 and 1 in the present embodiment) that tries to represent the importance that the user places on the target/suggestion association in that database entry. The number is assigned a default value when the entry is first created in the database 218, and then modified with reinforcement learning as suggestions are offered to the user and either accepted or rejected. Importance values are given that name herein based on the functions they perform in an implementation of the invention; they could of course be given different names in a different embodiment. Again, in the present embodiment the suggestions database 218 is implemented as a table, with each entry in a separate row. In another embodiment it can be implemented in other ways. What is important here is the associations between targets and synonyms, and the importance values assigned to those associations.

The proposals database 220 contains a plurality of entries, with each entry including a "target" field (similar to the target fields in the synonyms and suggestions databases 216 and 218), a "display text" field, containing the text to be shown to the user in the event of a match, a "selection text" field, which is the token string that, if the proposal is offered to and accepted by the user, can be automatically sent into the interpretation network 214 as if it had been input by the user manually. As with suggestions, the selection text typically appears to the interpretation network 214 as follow-up input to prior user input. It is formatted similarly to the format used for user input (or easily convertible to that format), rather than the format used for actuation strings. Because it is forwarded back into the interpretation network 214 if accepted by the user, the selection text of proposals, as well as the suggestion text of suggestions, are both sometimes referred to herein as "additional potential input." Each proposal entry also includes an "importance" field, which like suggestions, contains a value (between 0 and 1 in the present embodiment) that tries to represent the importance that the user places on the target/proposal association in that database entry. The number is assigned a default value when the entry is first created in the database 220, and then modified with reinforcement learning as proposals are offered to the user and either accepted or rejected. Each proposal entry also includes the interpretation of the selection text itself, and the purpose of this field is explained elsewhere herein. As with synonyms and suggestions, the proposals database 220 can include more than one entry with the same "target" field contents. In this case the proposals represent alternative proposals that the system might offer in response to the same matching user input. Again, in the present embodiment the suggestions database 220 is implemented as a table, with each entry in a separate row. In another embodiment it can be implemented in other ways. What is important here is the associations between targets and proposals, and the importance values assigned to those associations.

Interaction Agent

Figure 3:
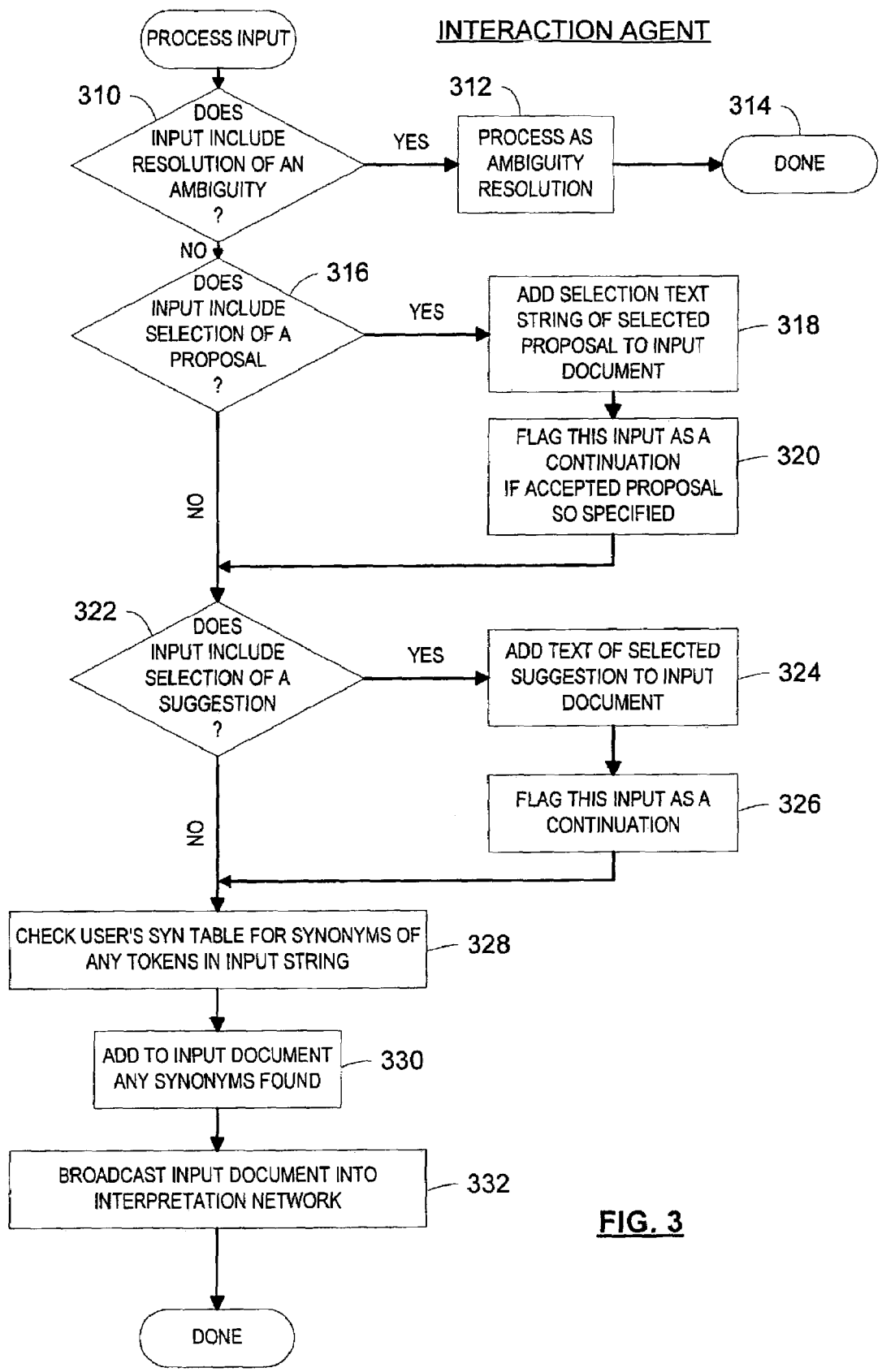
FIG. 3 is a flowchart of steps that take place in the interaction agent in FIG. 2.

FIG. 3 is a flow chart describing in more detail some of the steps that take place in the interaction agent 210 upon receipt of user input. Some of these steps are also set out in more detail in the "process( )" method of class InteractionAgent, which is incorporated herein from the java file named InteractionAgent.java in the accompanying Computer Program Listing and Table Appendices. The flowcharts included herein should be considered symbolic rather than literal, describing an implementation at a level which is considered most helpful to the reader. It will be appreciated that an embodiment often can perform the various steps of a flowchart in a sequence different than that shown, or in some cases in parallel with other steps. As shown in the flowchart, the interaction agent 210 first checks whether the user input includes a resolution of an ambiguity previously put to the user for resolution (step 310). If so, then the input is processed as an ambiguity resolution (step 312) and the routine exits (step 314).

If not, then the agent next determines whether the input includes selection of a proposal that was offered to the user as part of a previous interaction (step 316). In the present embodiment proposals are offered using descriptive text ("display text"), and partially in order to simplify this determination, the user accepts a proposal by selecting an appropriate choice offered by the system rather than by new natural language input. In a graphical user interface (GUI), for example, the system might offer a check-box, a radio button or a drop-down list from which the user selects a response. Each user choice involving acceptance of a proposal also has attached to it a "selection text" string, which can differ from the display text. In step 318, if the user input does include acceptance of a proposal, the interaction agent 210 adds the "selection text" of the accepted proposal to the input token sequence. In one embodiment, the "selection text" string includes information to be added to the actuation string literally, and the interpretation network 214 is designed to recognize this. In the present embodiment, however, the "selection text" is in the form of additional user input that was carefully chosen by the proposal creator such that when interpreted by the NLI 214, an actuation string will result that will cause the actuation agent 212 to command the back-end application in a manner appropriate to acceptance of the proposal.

For example, in a movie database application the following exchange might occur:

Users get me movies times for that Harrison Ford movie that is playing in Sunnyvale System> Here are the Harrison Ford movies playing in Sunnyvale: [a list of movies and times is displayed here]

There is a special on all movies showing at Cinema X in Sunnyvale at the moment—if you buy one ticket you get one free. Would you like to see movies showing there?

The last paragraph in the above example is the display text of a proposal. The aim of this proposal is to push information regarding a special on movies at Cinema X, and it is targeted at people who are looking for movies in Sunnyvale. The selection text for the proposal might be something such as "get movies showing at Cinema X", which might be interpreted by the interpretation agent 214 as:

<find>
      <movie>
        <movieTheatre>Cinema X</movieTheatre>
      </movie>
    </find>

It is also possible for the system to maintain context, and this option can be set as an attribute of a proposal. Thus in step 320, if the accepted proposal includes the attribute for maintaining context, the user input (including the selection text) is flagged as a continuation of the prior input. If context is maintained in the above example, the information originally entered by the user is used in the interpretation of the user's response to the proposal. Thus if the system had offered the above proposal in response to the user's request in prior input for movies starring Harrison Ford and showing in Sunnyvale, then the interpretation resulting from context being maintained might be:

<find>
      <movie>
        <movieStar>Harrison Ford</movieStar>
        <movieLocation>Sunnyvale</movieLocation>
        <movieTheatre>Cinema X</movieTheatre>
      </movie>
    </find>

In this case, the system has remembered that the user is looking for Harrison Ford movies in Sunnyvale in particular, so that when the proposal to get movies at Cinema X is selected, the information regarding Harrison Ford and Sunnyvale is maintained.

A disadvantage of maintaining context is that there may be cases where the information previously given by a user, when combined with a proposal, gives an interpretation that is too narrow, and hence does not give the results intended by the proposal creator. An example of this would be if, in the above example, Cinema X was not in Sunnyvale. In this case the actuation of the interpretation in the above example would fail because the movie database back-end application would not be able find any movies matching the user's incorrectly interpreted request. For this reason care must be taken when creating proposals to ensure that the interpretations returned are what the proposal creator expects, especially if context is maintained.

In step 322, if the user input did not include selection of a proposal, the interaction agent 210 then determines whether the user input includes selection of a suggestion previously offered by the system. As with proposals, a user accepts a suggestion by selection of a choice offered by the system. Suggestions could be implemented similarly to proposals, with display text, selection text and an attribute for maintaining context, but in the present embodiment they are not. Instead the suggestions offered to the user are the same text strings that are added to the user input and forwarded to the interpretation network 214 in response to acceptance of a selection. Thus in step 324, if the input does include acceptance of a suggestion, the interaction agent 210 adds the text of the accepted suggestion to the input string. In addition, in step 326, since the acceptance of a suggestion is by nature a continuation of the user's previous input, the interaction agent 210 also flags the input as a continuation.

In step 328, again whether or not the user input includes acceptance of any proposals or suggestions, the interaction agent queries the actuation agent 212 for any synonyms associated with the user input. Since this query occurs after the processing of any suggestions and proposals, the text sent to the actuation agent 212 for the query includes any additional user input that was added in steps 318 and/or 324. In step 330, any synonyms found are added to the input document. In one embodiment, the input document is merely a sequence of tokens, and the additional user input and synonyms are merely appended to the end. In another embodiment, the input document is organized into fields, and synonyms are added in a separate synonyms field, associated either with the entire input string or with only the individual tokens that produced each synonym. The input document might, for example, be an XML document. In a step 332, the resulting input document is broadcast into the interpretation network 214 for an interpretation.

Interpretation Network

Figure 4:
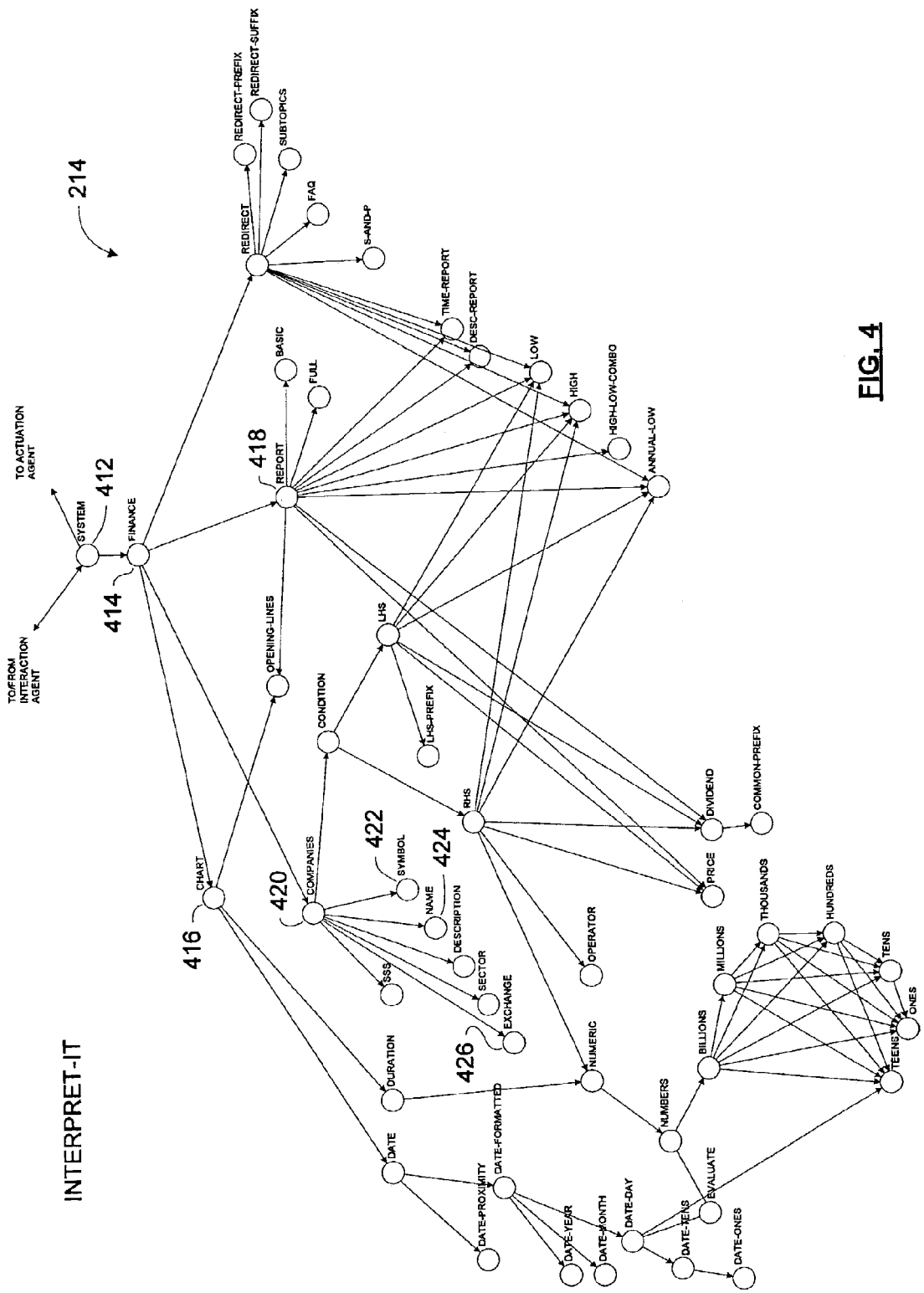
FIG. 4 is a diagram of an example interpretation network of FIG. 2.

The interpretation agent 214 is a typical AAOSA-based agent network adapted for use with the relevant back-end application. FIG. 4 is a diagram of an example interpretation network 214, used for implementing a natural language interface to a back end application that is designed for financial reporting. In particular, the back end application in this example is an Internet-queryable database provided by EDGAR Online, Inc. More information about the database can be found at http://www.finsight.com, visited Feb. 5, 2002, and incorporated herein by reference. This product permits a web client to retrieve desired financial information automatically using URL-based queries. The interface to this back end application, therefore, includes the formulation of the appropriate URL for satisfying the user's inquiry.

Only a partial representation of the interpretation network 214 appears in FIG. 4. A more complete version of the network is described in the Opal file named opal.txt in the accompanying Computer Program Listing and Table Appendices. An Opal file is an XML document which defines certain properties of each of the agents in an agent network. The agents themselves are implemented as instances of java classes and subclasses, and the Opal file specifies, for each agent and among other things, the specific class or subclasses from which the agent is to be instantiated, which other agents each particular agent listens to for each particular kind of message, as well as (for most agents) a set of one or more "interpretation policies" which implement the interpretation task for which the particular agent is responsible. The Opal file is used by an Opal converter program at system startup time to instantiate the entire agent network such as network 314. The Opal file in opal.txt can be understood by a person of ordinary skill, especially with the assistance of the Dejima Policy Reference, Platform 3.0, a copy of which is attached hereto in Appendix A. In addition, it will be understood that the Opal file uses standard XML coding, in which (among other things):

| [0059] | ![CDATA[. . .]] | indicates that ". . ." is to be interpreted as Character data; |
| [0060] | &letter; | means "<" (left angle bracket) |
| [0061] | > | means ">" (right angle bracket) |
| [0062] | & | means "&" (ampersand) |
| [0063] | ' | means "'" (apostrophe) |
| [0064] | " | means """ (quotation mark) |

As described in the Dejima policy reference, an interpretation policy contains, among other things, a policy condition and a policy action. When an agent receives a message from another agent to attempt to interpret and input string, it compares the input string to each of the agent's policy conditions in sequence. If a condition does apply to the input string, or to part of the input string, then the policy makes a "claim" on the applicable portion of the input string, and returns the claim to the agent that requested the interpretation. A claim identifies (among other things) the agent and policy which is making the claim, the portion of the input string to which the claim applies (called the claim "focus"), the priority number of the agent or policy, and also a confidence level which indicates how well the input matches the policy condition. The priority and confidence levels, and the focus, all can be used subsequently by upchain agents for comparison with other claims made by other downchain agents, so as to permit the upchain agent to select a "best" one among competing claims.

Policy conditions are written as expressions made up from operators and operands. The various operators include unary operators such as <exists>, <exact>, <substring>, <accent>, <accent-substring>, REPEAT and RECURSRVE. They also include binary operators such as OR, AND, ORDERED, ADJACENT and COMBO. The operands on which an operator can act include tokens (words, strings, numbers, symbols, delimiters), text files (which can contain their own policy conditions), databases, and claims made by other policies. If a first policy condition (the "referencing policy condition") refers to a second policy (the "referenced policy") previously evaluated in the same agent, then any claim made by the referenced policy can be figured into the evaluation of the referencing policy condition in the manner specified by the operators. If a policy condition refers to another agent (the "referenced agent") downchain of the current agent (the "referring agent"), then the claim or claims returned by the referenced downchain agent are figured into the evaluation of the referencing policy condition in the manner specified by the operators. Note that a policy condition that references a downchain agent cannot be completely resolved until the input string is passed to that other agent for comparing to its own policy conditions. In one embodiment, the referencing agent passes the input string to each downchain agent only upon encountering the agent's name while evaluating a policy condition. In the present embodiment, however, the referencing agent passes the input string to all downchain agents mentioned in any policy condition in the referencing agent, before the referencing agent begins evaluating even its first policy condition.

In FIG. 4, the interaction agent 210 initiates an interpretation attempt into the interpretation network 214 by communicating the input document, in an object of class "InitiateInterpretationMessage", to the Top agent of the network 214. In the network of FIG. 4, the Top agent is System agent 412. The Top agent contains one or more interpretation policies whose policy conditions, in a typical network, do very little aside from referencing one or more other agents deeper in the network. System agent 412, for example, contains a single interpretation policy whose policy condition does nothing more than reference the Finance agent 414. Such a policy condition applies to the input token string if and only if the Finance agent can make a claim to at least part of the input token string. When System agent 412 encounters this policy condition, therefore, it forwards the input token string to the Finance agent 414 in an object of class "IntepretItMessage". The Finance agent 414 is thus considered to be "downchain" of the System agent 412, and the System agent 412 is considered to be "upchain" of the Finance agent 414.

When the Finance agent 414 receives the input token sequence, it first looks in its policies for policy conditions that make reference to further agents downchain of the Finance agent 414. If there are any, then the Finance agent 414 forwards the input token string to each of the further downchain agents in an "IntepretItMessage" and awaits replies. In the embodiment of FIG. 4, the Chart, Report and Companies agents 416, 418 and 420, respectively, are all referenced in the Finance Agent's policy conditions and are therefore downchain of the Finance Agent 414. Each agent downchain of the Finance agent 414 does the same upon receipt of an InterpretItMessage. When an agent has received all replies (or in certain embodiments, times out on all replies not yet received), the agent tests the input token sequence against the agent's policy conditions. The agent processes the input in order from the agent's first policy to its last policy. Each policy makes all the claims it can on the input. Subsequent policies in the agent can make reference to claims made by previously processed policies in the agent, as well as to claims made by downchain agents. After all policies have made their claims the agent uses a predetermined algorithm to select the "best" claim. If the best claim is one made from a non-grammatical condition (e.g. combo operator), then the sub-claims are also selected. The agent then returns the selected claim or claims to the agent's upchain agent in an object of class ClaimMessage. If the agent is not able to make any claims on the input, then the agent passes upchain an object of class NoClaimMessage.

Thus in the embodiment of FIG. 4, the Finance agent 414 eventually will receive any claims made by its downchain agents and will refer to such claims in the evaluation of its own policy conditions. The Finance agent 414 then will respond to the System agent 412 with either a ClaimMessage or a NoClaimMessage. If the System agent 412 receives a NoClaimMessage, then the System agent's single policy does not apply. A null actuation message will still be sent to the actuation agent 212, but no suggestions or proposals will be identified, and no command will be sent to the back-end application. If the System agent 412 receives a ClaimMessage, then the System agent's policy does apply.

The System agent 412 evaluates its own policy conditions in the same manner as other agents in the network, and each such policy again makes as many claims as it can on the input. But because the System agent 412 is the Top agent, it does not transmit any resulting claims (or NoClaims) to any further upchain agents. Instead, as the Top agent of a network, after selecting one or more "best" claim(s) in the manner described above, System agent 412 has the responsibility to delegate "actuation" to the agents and policies that made up the claim(s). This process, which is sometimes called "executing" the winning claim, takes place according to the "action" part of the winning policy or policies in the Top agent. The action part of a policy builds up an actuation string in a manner similar to that in which policy conditions build up the result of the condition, that is, by string operators and operands that can include words, numbers, symbols, actuation sub-strings already created by other policies within the same agent, and actuation sub-strings created by other downchain agents. Typically the downchain agents referred to in the action part of a policy are the same agents referred to in the condition part of the policy. Also typically, the actuation string built up by this process is an XML string.

In order to fill in the actuation sub-strings defined by downchain agents, the Top agent sends an object of class DelegationMessage to each downchain agent referenced in the action part of the winning policy(ies). In the embodiment of FIG. 4, the System agent 412 contains only one policy, the action part of which does nothing more than delegate to the Finance agent 414. The actuation sub-string returned by the Finance agent 414 therefore will be the actuation string output of the network. The DelegationMessage received by an agent includes a reference to the particular policy or policies of that agent which formed part of the winning claim. Upon receipt of such a message, therefore, the agent executes the action part of each of its policies that formed part of the winning claim, issuing DelegationMessages of its own to its own downchain neighbors as called for in the action part of the such policies, and building up an actuation sub-string for returning to the agent's upchain caller. Actuation sub-strings are passed to upchain agents in objects of class ActuationMessage, ultimately once again reaching the Top agent of the network (System agent 412). This agent in the present embodiment returns the actuation message in the form of an XML string to the Process method of Actuation agent 212. The actuation message contains the user's intent, as interpreted by the interpretation network 214, and can be converted by the actuation agent 212 into appropriate commands in the URL format required by the back-end application.

Thus it can be seen that interpretation of the user's intent takes place in an agent network in a distributed manner. Each of the agents in interpretation network 214 can be thought of as having a view of its own domain of responsibility, as defined by its interpretation policies. Typically the application domain is organized by the designer into a hierarchy of semantic sub-domains, and individual agents are defined for each node in the semantic hierarchy. In the embodiment of FIG. 4, for example, the Finance agent 414 is responsible for all semantics that relate to finance (i.e., all queries in the entire application domain in this example). The Chart agent 416 is responsible for detecting and acting upon parts of user queries that have to do with financial charting, whereas Report agent 418 is responsible for detecting and acting upon parts of user queries that have to do with financial reporting. Companies agent 420 is responsible for detecting and acting upon parts of user queries that have to do with company names. The Companies agent 420 has downchain thereof a Symbol agent 422, responsible for detecting and acting upon parts of user queries that involve company names provided in the form of a trading symbol; a Name agent 424, responsible for detecting and acting upon parts of user queries that involve company names provided as a company name; an Exchange agent 426, responsible for detecting and acting upon parts of user queries that involve companies that are trading exchanges, and so on.

It can also be seen that the Top agent of a network is responsible for receiving input and initiating queries into the network, and the agents representing the functionality of the system (the agents constructing their actuation sub-strings without reference to further agents) are the lowest order nodes (leaf agents) of the network. The network operates in two main phases: the interpretation phase and the delegation phase. In the interpretation phase, an initiator agent (such as the Top agent) receives the input token sequence and, by following its policy conditions, queries its downchain agents whether the queried agent considers the input token sequence, or part of it, to be in its domain of responsibility. Each queried agent recursively determines whether it has an interpretation policy of its own that applies to the input token sequence, if necessary further querying its own further downchain agents in order to evaluate its policy conditions. The further agents eventually respond to such further queries, thereby allowing the first-queried agents to respond to the initiator agent. The recursive invocation of this procedure ultimately determines a path, or a set of paths, through the network from the initiator agent to one or more leaf agents. The path is represented by the claim(s) ultimately made by the initiator agent. After the appropriate paths through the network are determined, in the delegation phase, delegation messages are then transmitted down each determined path, in accordance with the action parts of winning policies, with each agent along the way taking any local action thereon and filling in with further action taken by the agents further down in the path. The local action involves building up segments of the actuation string, with each agent providing the word(s) or token(s) that its policies now know, by virtue of being in the delegation path, represent a proper interpretation of at least part of the user's intent. The resulting actuation string built up by the selected agents in the network are returned to the initiator agent as the output of the network. This actuation string contains the fields and field designators required to issue a command or query to the back-end application, to effect the intent of the user as expressed in the input token string and interpreted by the interpretation network 214. Note that the transmission of a delegation message to a particular agent is considered herein to "delegate actuation" to the particular agent, even if the particular agent effects the actuation merely by forwarding the delegation message to one or more further agents.

Actuation Agent

Figure 5:
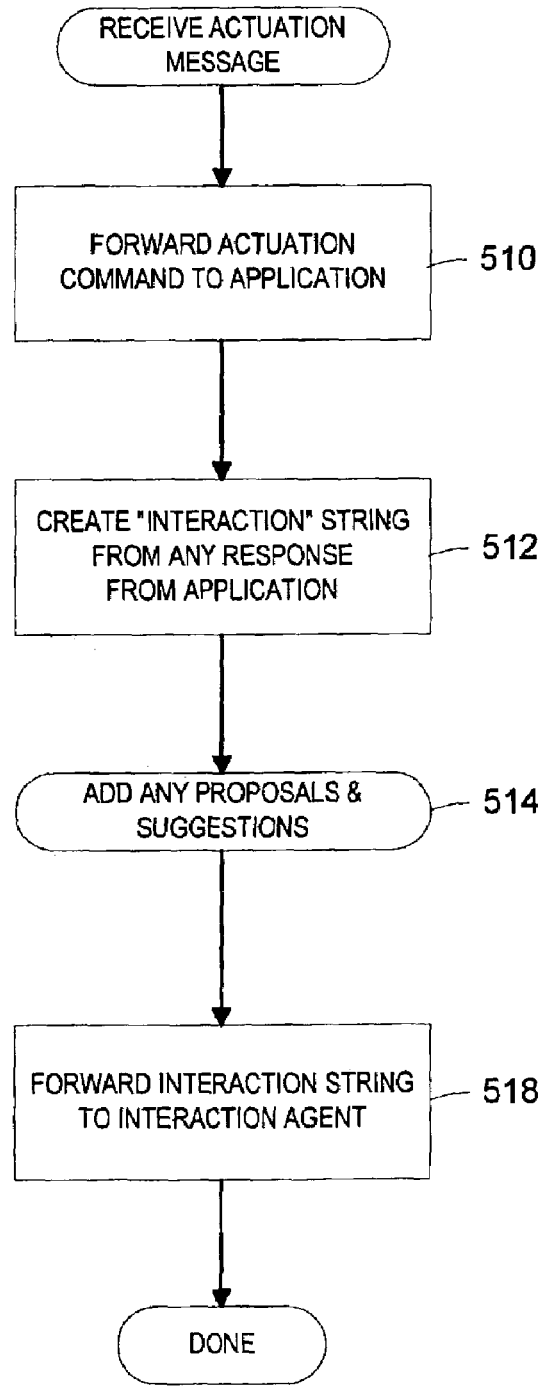
FIG. 5 is a flowchart of steps that take place in the actuation agent of FIG. 2.

FIG. 5 is a flowchart of steps that take place in the actuation agent 212 in response to receipt of an actuation message from the interpretation network 214. Some of these steps are also set out in more detail beginning with the "handleActuation( )" method of class XMLActuationAgent, which is incorporated herein from the java file named XMLActuationAgentjava.txt in the accompanying Computer Program Listing and Table Appendices. In a step 510, the actuation agent 212 first converts the actuation string from its incoming XML format to whatever format and command sequence is required by the back-end application to effectuate the intent of the user. The commands are forwarded to the back-end application by whatever transport mechanism is in use. In step 512, the actuation agent 212 receives any response from the back-end application, and uses it to create an "interaction" string for transmission toward the user. This string is referred to herein as an interaction string rather than a response, because it can often request further input from the user. It will certainly request input from the user if it ultimately includes proposals or suggestions.

In step 514, the actuation agent 212 adds to the interaction string any proposals and suggestions that it has relative to the actuation string. In step 518, the actuation agent forwards the resulting interaction string to the interaction agent 210 for output toward the user.

Figure 6:
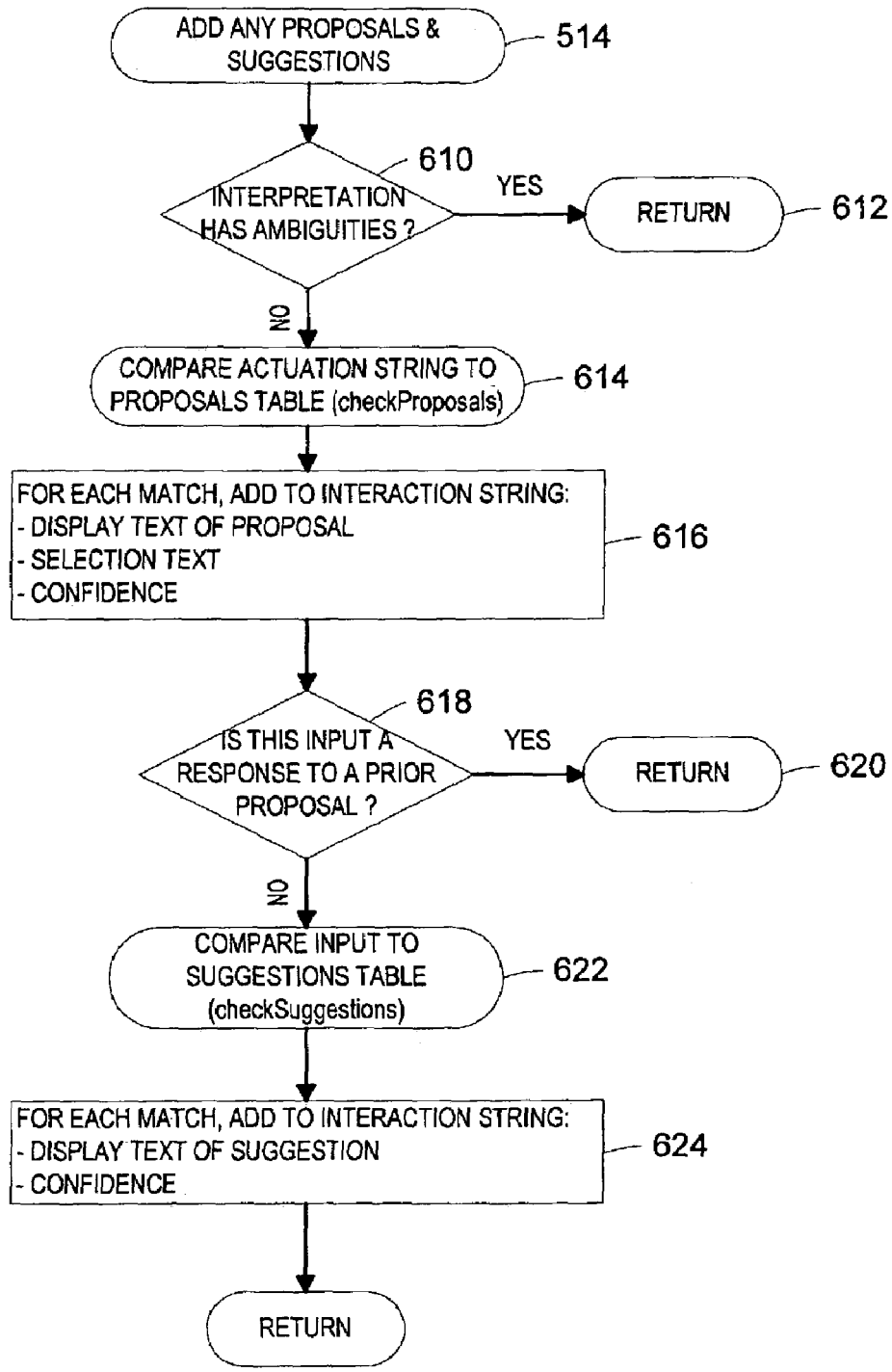
FIG. 6 is a flowchart of the step in FIG. 5 for adding any proposals and suggestions to the interaction string.

FIG. 6 is a flowchart of the step 514 for adding any proposals and suggestions to the interaction string. Some of these steps are also set out in more detail beginning with the "handleProposalSuggestion( )" method of class XMLActuationAgent, which is incorporated herein from the java file named XMLActuationAgentjava.txt in the accompanying Computer Program Listing and Table Appendices. In step 610, it is first determined whether the interpretation includes ambiguities. If so, then the routine returns without trying to identify any proposals or suggestions (step 612). In step 614, if there are no ambiguities, the actuation agent 212 compares the actuation string to the target strings of proposals in the proposals database, in the manner described hereinafter, to identify any proposals that it has that are relevant to the actuation. In step 616, for each proposal match found, the actuation agent 212 adds to the interaction string the display text of the proposal, the selection text, and the confidence level with which it considers the proposal relevant. The agent can also add the attribute for maintaining context, if the embodiment supports it.

Because proposals are supposed to generate complete interpretations by themselves, the system does not try to make any new suggestions to the user if the current user input is in response to a prior proposal. In step 618, therefore, it is determined whether the current user input is a response to a prior proposal. If so, then the routine returns (step 620) without making any new suggestions. If the current user input is not a response to a prior proposal, then in step 622, the routine compares the user input token sequence to the target token sequences in the suggestions database, again in the manner described hereinafter, to identify any suggestions that it can consider relevant to the actuation. In step 624, for each suggestion match found, the actuation agent 212 adds to the interaction string the display text of the suggestion (which in the present embodiment is also the selection text string of the suggestion), and the confidence level with which it considers the suggestion relevant. The routine then returns to the caller.

Figure 7:
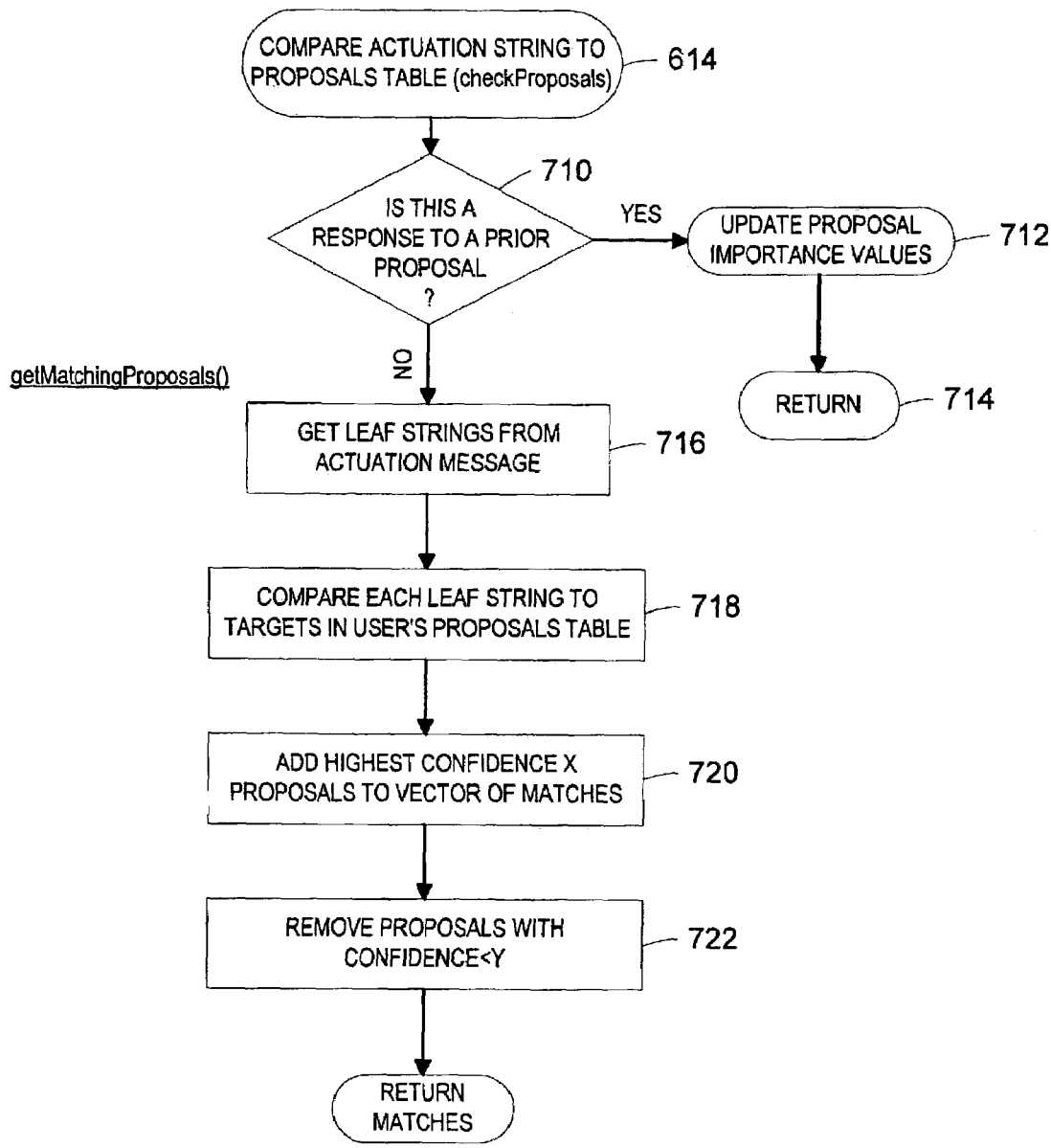
FIG. 7 is a flowchart of the step in FIG. 6 for comparing the actuation string to the proposals table.

FIG. 7 is a flowchart of the step 614 for comparing the actuation string to the proposals table. Some of these steps are also set out in more detail in the "checkproposals( )" and "getMatchingProposals( )" methods of class ProposalTable, which is incorporated herein from the java file named ProposalTablejava.txt in the accompanying Computer Program Listing and Table Appendices. In step 710, the routine first determines whether the current user input is a response to a prior proposal. If so, then the routine only updates in its proposals database the importance values of all the proposals that were offered to the user in the prior interaction (step 712). As described in more detail below, importance values are increased for proposals that were accepted by the user, and are decreased for proposals that were offered but rejected (not accepted) by the user. The decrease in importance values is commensurate with the confidence with which each proposal was considered relevant, so that proposals that were offered with higher confidence are punished more than proposals that were offered with lower confidence. The routine then returns without any additional proposals (step 714).

In step 716, the actuation message is expanded into complete "leaf" strings. Since the actuation strings in the present embodiment are represented in XML, expansion to complete leaf strings involves substitution of user input tokens for XML tags, deletion of XML disjunctive operators, and replication of segments having conjunctively connected portions to complete independent strings with the formerly conjunctively connected portions in separate strings. That is, For example, the following actuation XML:

```
<get>
  <or >
    <movieType> action </movieType>
    <movieType> thriller </movieType>
  </or >
  <movieTheatre> AMC6</movieThreatre>
</get>
``` would be expanded into the following three leaf strings:
"get movieType action"
"get movieType thriller"
"get movieTheatre AMC6"

In step 718, each of the leaf strings is compared to each of the targets (also converted to leaf strings for the comparison) in the user's proposals table, and a confidence value is calculated for each proposal in the proposals database 220. The confidence value Cf, is the product of context value C, and the Importance value I of the proposal. The context value C is a measure of how well the target of the proposal matches the actuation string (as represented by the leaf strings), and the importance value is a measure of how much importance the user places on the association between the target and the proposal (i.e., how likely the user will be interested in this proposal if the actuation matched the target string of the proposal exactly). It is the latter value, I, that is adapted through reinforcement learning based on the user selection or non-selection of presented proposals. A benefit of having proposal selection based in part on a learned parameter is that those proposals that are presented to a user but not selected become less likely to be repeatedly displayed. On the other hand, those proposals that a user finds useful are more likely to be presented to the user again. Since both C and I are values between 0 and 1 in the present embodiment, confidence values Cf are also limited to this range.

The context value for a particular proposal relative to particular actuation is calculated using a correlation between the two. In particular, context is calculated using:

$$C = t/i * t/p = t^2/ip,$$

where C is the Context, t is the number of matching corresponding XML leaf strings found in both the user and proposal interpretations, i is the number of XML leaf strings in the user interpretation, and p is the number of XML leaf strings in the proposal interpretation. Note that Context will be a value between 0 and 1. As an example, consider the following example user interpretation XML:

```
<find>
  <movie>
    <movieStar>Harrison Ford</movieStar>
    <movieLocation>Sunnyvale</movieLocation>
  </movie>
</find>
``` and proposal target XML:

```
<find>
  <movie>
    <movieLocation>Sunnyvale</movieLocation>
  </movie>
</find>
```

The above interpretations give the following values: t=1, i=1, p=2, resulting in a Context of C=0.5. The XML leaf string that matches in this case is that associated with "Sunnyvale". It is possible to set up the matching process to ignore certain XML tags when comparing interpretations. For example, in an embodiment, the tags "<or >" and "<and>" are ignored. It is also possible to use a fuzzy text-matching algorithm for the leaf values themselves (which would be applied to "Sunnyvale" in the above example).

The advantage of calculating Context using XML interpretations rather than user input is that it allows context matching to be performed on the user and proposal intent, as opposed to the natural language phrasing of the user and proposal creator.

Proposals are selected for display to the user based on the confidence score. There is also a preset limit, in the present embodiment, on the total number of proposals to be presented to the user regardless of their confidence score. In step 720, therefore, only the proposals with the X highest confidence scores are added to a vector of proposal matches, where X is a predetermined number. In step 722, any proposals in the vector with a confidence score less than another predetermined value Y are removed. The routine then returns with the resulting vector of proposal matches.

Figure 8:
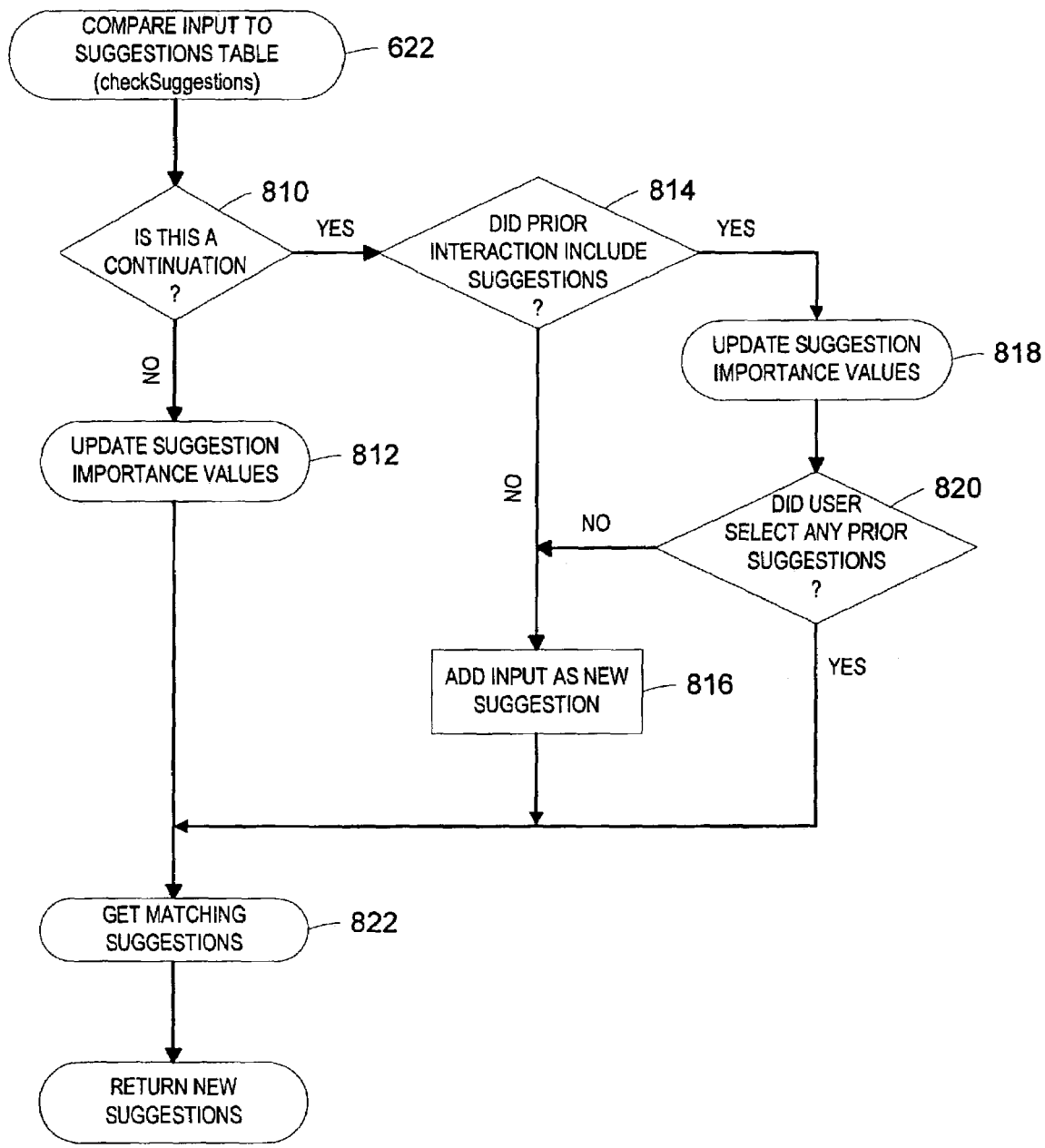
FIG. 8 is a flowchart of the step in FIG. 6 for comparing the actuation string to the suggestions table.

FIG. 8 is a flowchart of step 622 in FIG. 6, for comparing the actuation string to the suggestions table. Some of these steps are also set out in more detail in the "checkSuggestions( )" method of class SuggestionTable, which is incorporated herein from the java file named SuggestionTable.java.txt in the accompanying Computer Program Listing and Table Appendices. Initially, in step 810, the actuation agent 212 determines whether the present user input is a continuation of prior input. If not, then the procedure moves on to step 812, in which the importance values of suggestions, if any, that were offered to the user in the prior interaction, if any, are updated. If there were no suggestions offered in the prior interaction, then step 812 does not update any importance values. If there were, then the fact that the user decided not to continue the interaction means that the user has rejected all the suggestions that were offered. In the latter case, step 812 will punish all the suggestions offered as described hereinafter.

Whenever user input is a continuation of prior user input, the system can learn that the user sometimes follows the prior user input with the new user input. The system learns this as a new suggestion. Thus if step 810 determines that the present input is a continuation, then in step 814 it is determined whether the prior interaction included suggestions offered by the system. If not, then the system learns the new suggestion (step 816). In particular, the actuation agent 212 creates a new entry in the suggestions database 218 in which the target field contains the user's prior input phrase, the suggestion field contains the user's new input (response to the interaction), and an initial default value is written into the Importance field. An advantageous initial default value in this arrangement is around 0.8 because that would provide a bias towards more recently added suggestions. However, the system does not learn the new suggestion if the interpretation network 214 was completely unable to make an interpretation. Otherwise the system would be learning a useless suggestion, because the additional user input that would be submitted to the interpretation network if the user were to accept this suggestion would be just as uninterpretable then as it was the first time.

If step 814 determines that the prior interaction did include suggestions, then in step 818 the importance values of the suggestions offered to the user are updated as hereinafter described. In step 820 it is determined whether the user input includes selection of any of the suggestions that were offered in the prior interaction. Only if not is the new input used to learn a new suggestion in step 816. If the user input did include acceptance of a suggestion, then the system has already increased the importance value of the accepted suggestion in step 818.

Figure 9:
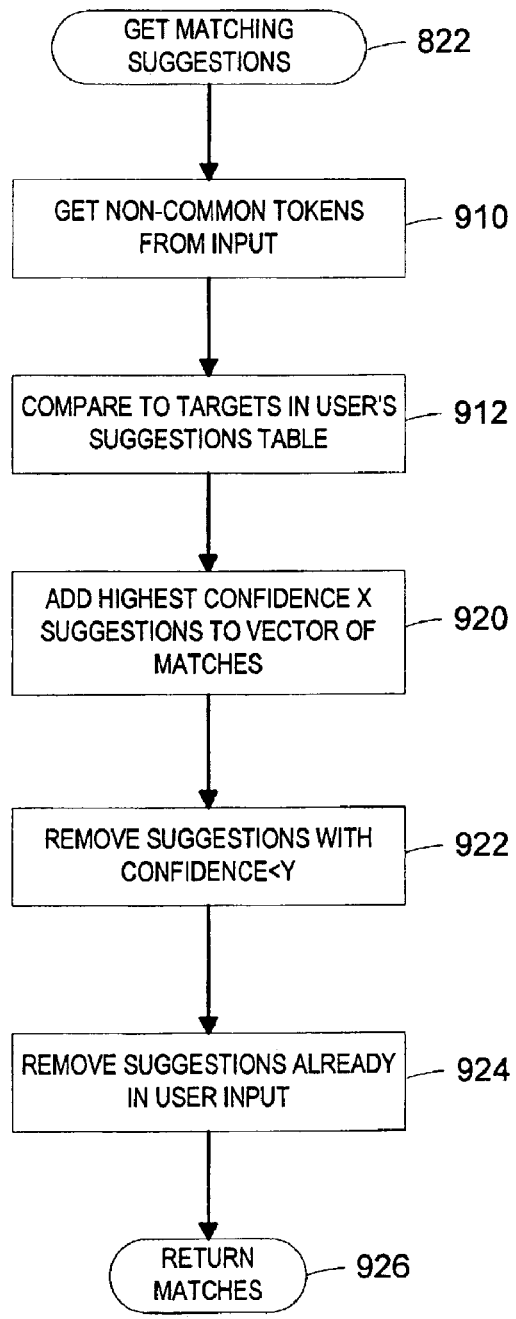
FIG. 9 is a flowchart of the step in FIG. 8 for determining whether any new suggestions can be offered to the user.

In step 822, regardless of whether any new suggestions were added or importance values were updated, the actuation agent 212 next determines whether any new suggestions can be offered to the user in a new interaction. FIG. 9 is a flowchart of step 822. Some of these steps are also set out in more detail in the "getMatchingSuggestions( )" methods of each of the classes SuggestionTable and Suggestions, both of which are incorporated herein from the java files named SuggestionTablejava.txt and Suggestionsjava.txt, respectively, in the accompanying Computer Program Listing and Table Appendices. In step 910, a string is created that contains only the non-common tokens. This is because common and noise tokens are not counted in the context matching correlation. In step 912, the resulting modified input string is compared to each of the targets in the user's suggestions database 218, and a confidence value is calculated for each suggestion in the database. The calculation of confidence values for suggestions is the same as that for proposals, described above. In particular, the confidence value Cf, is the product of context value C, measuring how well the target of a suggestion matches the modified input string, and the Importance value I of the suggestion, adaptively measuring how likely the user is to accept the suggestion if the modified input matched the target string of the suggestion entry exactly. Again, the values C, I and Cf are each limited to the range of 0 to 1 in the present embodiment.

As with proposals, suggestions are selected for display to the user based on the confidence score and a preset limit on the total number of suggestions to be offered in an interaction. In step 920, therefore, only the suggestions with the X highest confidence scores are added to a vector of suggestion matches, where X is a predetermined number. In step 922, any suggestions in the vector with a confidence score less than another predetermined value Y are removed. X and Y for suggestions can be the same or different than the corresponding values for proposals.

In step 924, one final check is performed before a suggestion is returned as a match, and that is to ensure that the information content in the suggestion is not already contained in the user input. This is done by comparing the suggestion and user input on a token by token basis (with noise and common tokens removed). The comparison is performed using, for example, fuzzy matching (such as sub-string matching). If all the tokens in the suggestion are found in the user input, then the suggestion is not returned. This check is performed to stop the presentation of useless suggestions. For example if the user asked "show me action movies in Sunnyvale", the suggestion "in Sunnyvale" would not be returned regardless of the calculated Confidence value. This same check can also be performed in a particular embodiment for proposals, although preferably for proposals, the interpretation of the selection text is compared with the user input interpretation, to make sure the leaf strings of the selection text are not a subset of the leaf strings of the user input interpretation.

In step 926, the routine then returns with the resulting vector of suggestion matches.

Context-based Reinforcement Learning

The reinforcement learning algorithm for Importance is the same for suggestions and proposals. No learning algorithm is needed for synonyms because the explicit learning of synonyms renders their importance effectively constant at 1.0. The learning algorithm calculates the average reward received over time received by a proposal or suggestion, starting with the initial assigned Importance value. For proposals, this initial value is set by the proposal creator and indicates the initial priority of the proposal. For suggestions, the initial value is set by system default upon creation of the suggestion. Only those proposals and suggestions presented to the user have their Importance values updated.

Importance values are updated in accordance with the following formula:

$$I_{k+1} = I_k + \frac{1}{1+k}[r_{k+1} - I_k],$$

where $r_{k+1}$ is the reward at step k+1 and $I_k$ is the Importance at step k. The reward received for the user acceptance of a proposal or suggestion is 1. The reward received by a proposal or suggestion that was presented to the user, but not selected, is based on the context value of the proposal or suggestion as follows:

$$r_{k+1} = [1 - C^n] I_k$$

where C is the proposal Context, and n is a constant real number greater than or equal to 0. The default value for this constant is 1.0.

The scaling of reward for unselected proposals is used because it allows the reward to be modified based on Context. For example, if a proposal has a small Context value and was not selected, the reward is such that there is only a minor reduction in the Importance value (for the case where the proposal has zero Context, the reward received is the current Importance value, resulting in no change in the Importance). On the other hand, if a proposal has a large Context value, and was not selected, the reward received approaches 0. The system therefore punishes proposals and suggestions that it made but were rejected, to a greater degree if the system thought the match was good than if it thought the match was poor.

The above learning algorithm also allows for a type of unlearning, or forgetting, to occur. For example, in the case where there are two suggestions for the same user phrase (such as 'turn to sports' suggesting either 'turn to ESPN' or 'turn to FOX'). Since both phrases will have the same Context, the one selected more often will have its Importance increased, while the other will have its Importance reduced, eventually falling so low as to not even show up in the suggestion list.

The parameter n allows for the effect of Context on the reward to be scaled. Larger values of n result in little change in the Importance value if a proposal is not selected. As the value for n approaches 0, the reward for not being selected also approaches 0, regardless of the Context. As mentioned above, n is a constant real number greater than or equal to 0, and has a default value of 1.0.

Figure 10:
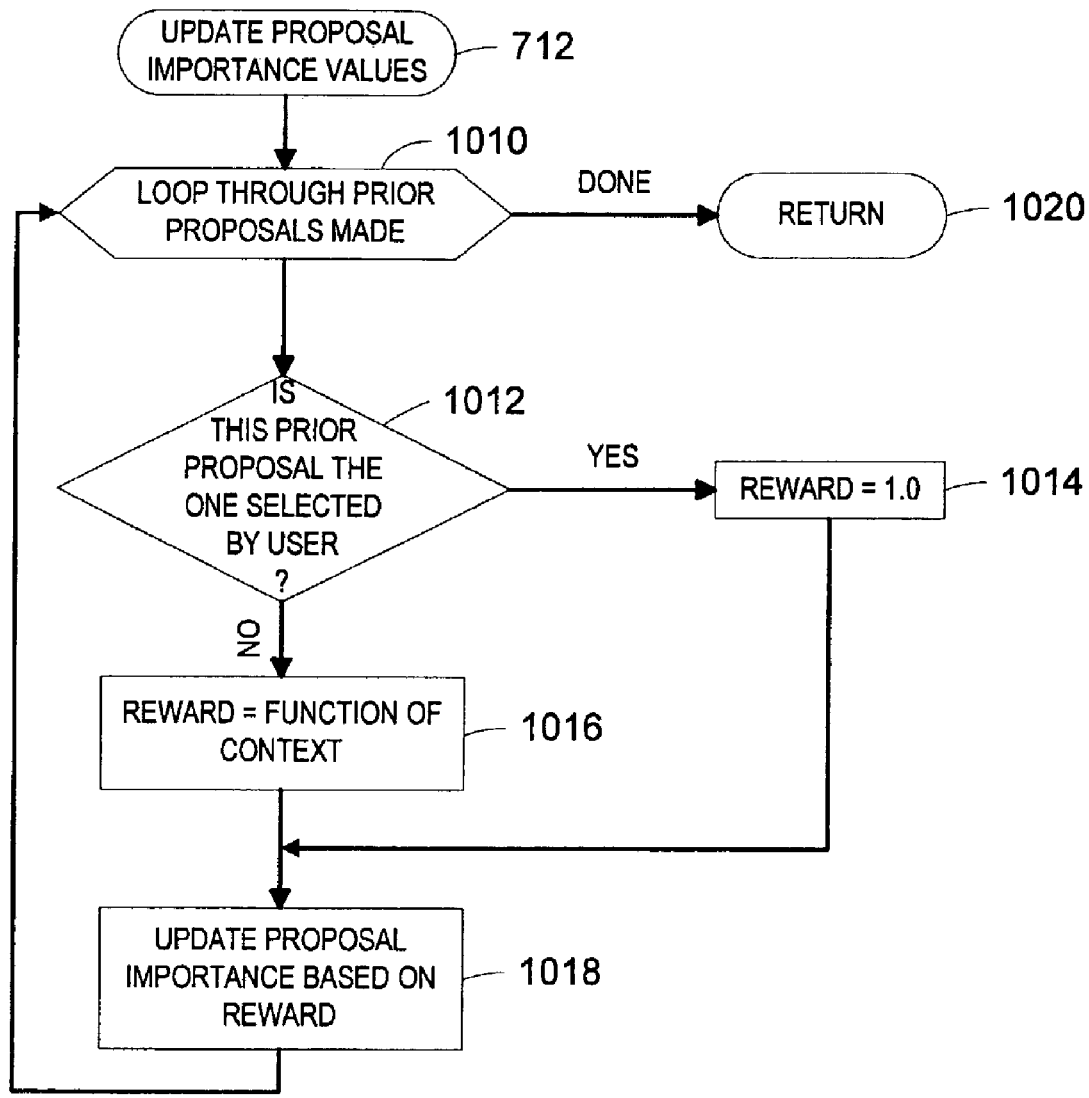
FIG. 10 is a flowchart of the step in FIG. 7 for updating proposal importance values.

FIG. 10 is a flowchart of the step 712 in FIG. 7, for updating proposal importance values. Some of these steps are also set out in more detail in the "updateImportance( )" method of class ProposalTable, which is incorporated herein from the java file named ProposalTable.java.txt in the accompanying Computer Program Listing and Table Appendices. In step 1010, the system loops through all the proposals that it made, if any, in the prior interaction, if any. For each proposal, step 1012 determines whether the proposal was accepted by the user. If so, then the reward value $r_{k+1}=1.0$ is assigned (step 1014). If not, then in step 1016 the reward value is assigned as a function of context, using the formula set forth above. In either case, in step 1018 the importance value of the proposal is updated based on the assigned $r_{k+1}$, and the loop continues with the next proposal made (step 1010). When the importance values of all proposals made in the prior interaction have been updated, or there were none made, then the routine returns (step 1020).

Figure 11:
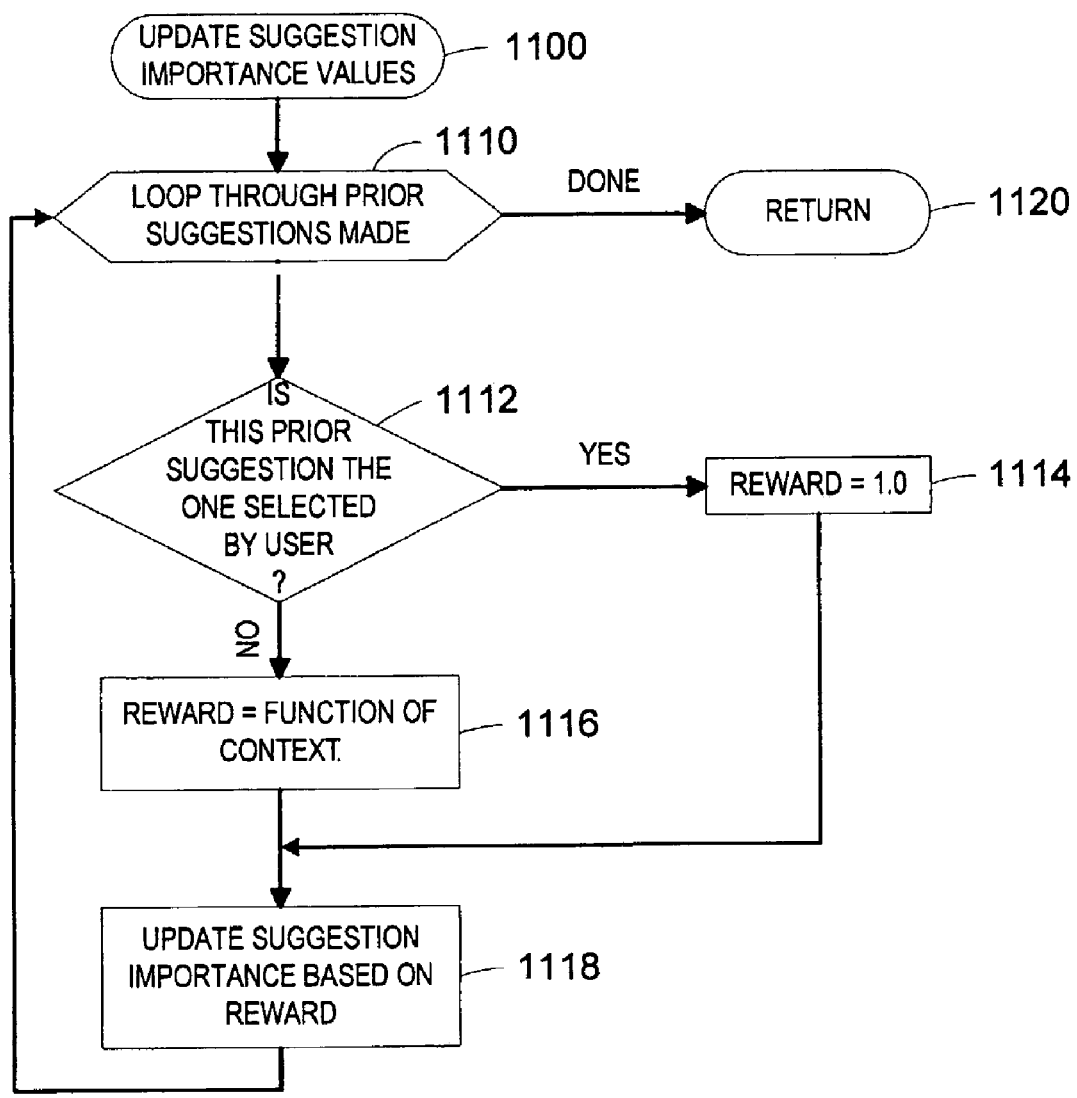
FIG. 11 is a flowchart of the steps in FIG. 8 for updating suggestion importance values.
Figure 12:
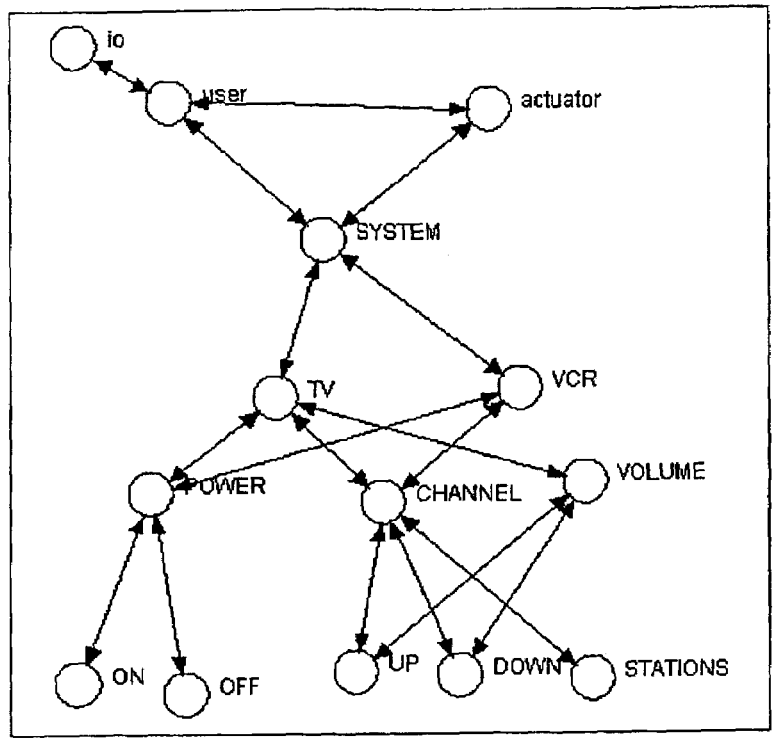
FIGS. 12–17 are diagrams of example agent networks and sub-networks.
Figure 13:
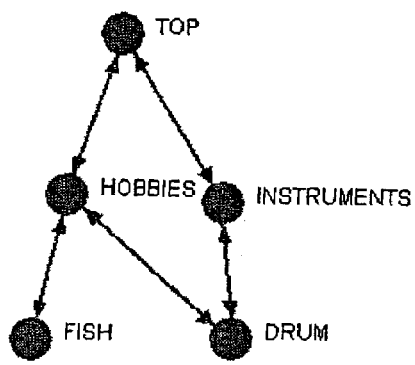
Figure 14:
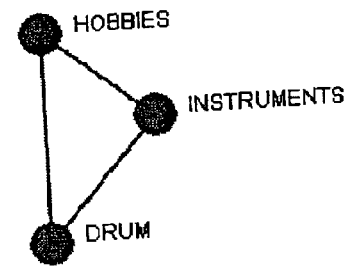
Figure 15:
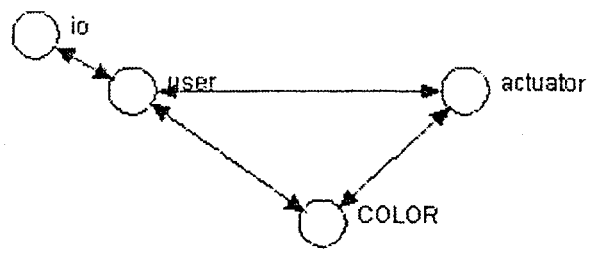
Figure 16:
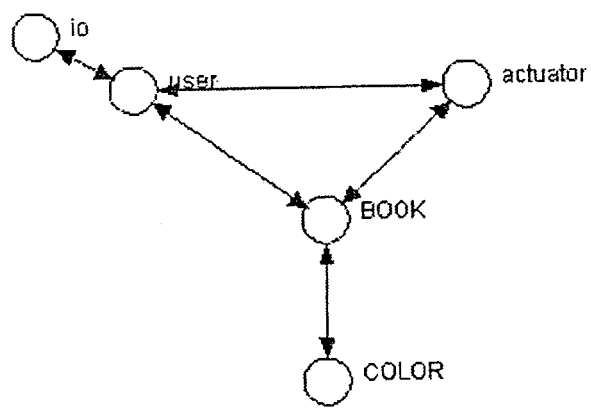
Figure 17:
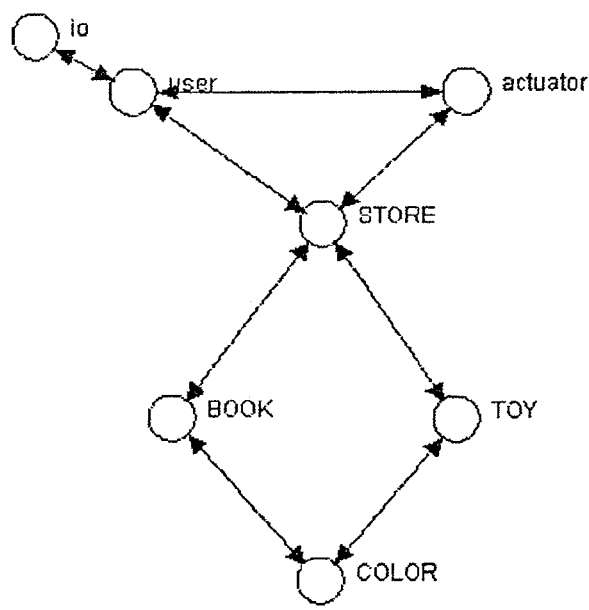

FIG. 11 is a flowchart of each of steps 812 and 818 in FIG. 8, for updating suggestion importance values. Some of these steps are also set out in more detail in the "updateImportance( )" method of class Suggestions, which is incorporated herein from the java file named Suggestionsjava.txt in the accompanying Computer Program Listing and Table Appendices. In step 1110, the system loops through all the suggestions that it made, if any, in the prior interaction, if any. For each suggestion, step 1112 determines whether the suggestion was accepted by the user. If so, then the reward value $r_{k+1}=1.0$ is assigned (step 1114). If not, then in step 1116 the reward value is assigned as a function of context, using the formula set forth above. In either case, in step 1118 the importance value of the suggestion is updated based on the assigned $r_{k+1}$, and the loop continues with the next suggestion made (step 1110). When the importance values of all suggestions made in the prior interaction have been updated, or there were none made, then the routine returns (step 1120).

Implementation of Synonyms

As mentioned, while synonyms can in some embodiments be learned through implicit learning, preferably they are learned explicitly. The process followed for synonym learning is that an agent, or group of agents, either in the interaction agent 210, the actuation agent 212 or the interpretation network 214, receives all input from the user and attempts to parse the input to extract a synonym. Preferably synonym recognition agents are included as part of the interpretation agent network itself, so that recognition of a synonym command occurs along with and in competition with other agent claims. If a synonym recognition agent makes a winning claim, then the synonym is added to the synonyms database 216. If a synonym already exists in the database for the same target phrase, then the new synonym is added at the front of the synonyms list. This ordering of the list allows unlearning to occur, while still retaining old synonyms.

A simple synonym extraction algorithm is given in the file named extractSynonyms.txt in the accompanying Computer Program Listing and Table Appendices. It is able to parse and extract the following synonyms (note that compound definitions are also handled).

'When I say sports I mean ESPN'
Potential terms not understood: 'sports'
synonyms generated: 'sports'='ESPN'
'sports is ESPN and flick equals movie'
Potential terms not understood: 'sports flick'
synonyms generated: 'sports'='ESPN', 'flick'='movie'
'Remember that around here is Sunnyvale or Mountain View'
Potential terms not understood: 'around here'
synonyms generated: 'around here'='Sunnyvale or Mountain View'

In an AAOSA-based system, instead of using explicitly programmed software to extract synonyms, synonyms are more preferably extracted using the fundamental capabilities of the agent network itself. In this embodiment, an agent or group of agents is defined, for example as a standard part of an interpretation network such as 214, which contains interpretation policies that make claims on portions of user input that evidence a user intent to create a synonym. If the claim is successful, then the action part of the policy causes the synonym to be written into the synonyms database 216. An example set of policies that can implement synonym extraction in this manner is as follows, using the Opal language:

```
(START:
    "
    ('when I say' | 'and' | 'learn that' | 'remember that')
        {attributes:'private'}
    "),
(EQUALS:
    "
    ('is the same' ['thing'] 'as' | 'means' | 'equals' | 'i mean'
    | '=')
        {attributes:'private'}
    "),
(SYNONYM1:
    "
    [START] ?
        {attributes:'private'}
        {action:
            {execute:? }}
    "),
(TARGET1:
    "
    SYNONYN1 < EQUALS ?
        {action:
            {execute:'Synonym = ',SYNONYM1,' Target = ',? }}
    *),
(CATCH:
    *
    TARGET1+
    *)
```

The above set of policies make claims on input that uses terms like 'when I say', 'and', 'learn that', 'remember that', 'is the same as', 'is the same thing as', 'means', 'equals', 'i mean', and '=', and if the claim wins, executes the action part of policy TARGET1. The action part of TARGET1 creates an actuation string of the form: 'Synonym=[synonym string] Target=[Target string]'. The actuation agent 212 then includes the ability to recognize an actuation string of this form, and to write the new synonym into the synonyms database 216 in response.

In an AAOSA-based implementation, synonyms are preferably applied on a per agent basis in the following manner to enhance the interpretation of user input. Before each policy makes its claims it checks the input to see if there are any synonyms for any input (target) tokens. In one embodiment each agent checks or queries the synonyms database 216 for this information, but in a more preferred embodiment, this check is performed once for all agents, by the interaction agent 210, as set forth above in step 328 (FIG. 3). When the input arrives at an individual agent in the interpretation network 214, it includes the targets and synonyms in a synonyms field of the user input document. The individual agent then checks each synonym in the input document, and if the target string matches any of the string tokens in the agent's policies, the target tokens are added to the policy with a disjunctive (OR) operator. The policies then make claims as normal.

For example, assume a user input "turn to sports", with a synonym of "ESPN" for the target token "sports". Assume further that an individual agent in the interpretation network 214 includes the following policy:

```
(P1:
    "
    "ESPN"
        {action:
            {execute:* }}
    ")
```

At run time, the policy checks all its string tokens (only "ESPN" in this case), and expands them with an OR operator and the target token of the matching synonym. Continuing the example, the policy executed at run time becomes:

```
(P1:
    "
    "ESPN" | "sports"
        {action:
            {execute:* }}
    ")
```

The policy then executes as normal. In this way the policy P1 will make a claim on "sports" from the user input "turn to sports", and it will be handled in the same manner as if the user input had been "turn to ESPN".

In an alternative embodiment, agents try their policies first against the native user input string. Then, if synonyms are present, the synonym is substituted in place of its target in the input string, and each policy is rechecked to see if it can now make a claim. Multiple synonyms for the same string are tried sequentially. Multiple synonyms for different strings are tried in the order they are encountered in the policy.

INDUSTRIAL APPLICABILITY

Thus it can be seen that synonyms, suggestions and/or proposals implemented in conjunction with a natural language interpretation interface to a back-end application, can help the system seem more intelligent and be able to interact in a more natural manner with the user. It can also be seen that a learning method for synonyms, suggestions and proposals can be advantageous because learning can be on a per user basis, it can be implemented as a modular system that can be inserted and removed at any time, it reduces the likelihood of producing unwanted results, and allows the unlearning of synonyms. Any one, two or all three of the concepts can be implemented in a particular embodiment, although implementation of two or all three in a single embodiment is most preferred.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. As one example, additional factors that may be taken into account when calculating context values include token adjacency and ordering. As another example, a particular embodiment could allow suggestions and/or proposals to be enabled or disabled on a system-wide or on a per-user basis. Suggestions and/or proposals can be enabled and disabled in response to a natural language command entered by the user and interpreted by the NLI 116. As other examples, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for user input to a back-end application, comprising the steps of:
    identifying synonyms in a synonyms database in dependence upon tokens in user input;
    developing a natural language interpretation of said user input in response to said user input and said synonyms in combination, including a step of forwarding said combination to a plurality of agents arranged in a network; and
    forwarding said interpretation toward said back-end application.

2. A method according to claim 1, wherein synonym entries in said database each include a target token sequence and at least one alternative token sequence;

and wherein said step of identifying synonyms comprises the step of comparing tokens in said user input to said target token sequences.

3. A method according to claim 2, wherein said step of developing a natural language interpretation comprises the step of developing said interpretation in response to a combination of said user input and the alternative token sequences of the synonyms identified in said step of identifying.

4. A method according to claim 1, wherein each of said agents has at least one interpretation policy having a policy condition and a policy action associated with the condition, each of said interpretation policies making a claim on at least part of a token sequence provided to the agent if the condition of the interpretation policy is satisfied, and executing the associated policy action in response to determination that the claim is at least part of a winning claim.

5. A method according to claim 4, wherein a particular one of said agents has a particular interpretation policy having a policy condition that refers to a downchain one of said agents, any claim made by said particular policy being dependent upon any claims made by said downchain agent.

6. A method according to claim 4, wherein a particular one of said agents has a particular interpretation policy having a particular policy condition that refers to a downchain one of said agents, said particular interpretation policy further having a particular policy action associated with said particular policy condition,
wherein said particular policy action includes at least partial delegation to said downchain agent.

7. A method for user input to a back-end application, comprising the steps of:
identifying synonyms in a synonyms database in dependence upon tokens in user input;
developing a natural language interpretation of said user input in response to said user input and said synonyms in combination, including a step of parsing said combination in a distributed manner; and
forwarding said interpretation toward said back-end application.

8. A method for user input to a back-end application, comprising the steps of:
identifying synonyms in a synonyms database in dependence upon tokens in user input;
developing a natural language interpretation of said user input in response to said user input and said synonyms in combination; and
forwarding said interpretation toward said back-end application,
wherein said step of developing a natural language interpretation comprises the steps of a particular agent in a natural language interpreter:
receiving a first message that includes said user input;
returning a message claiming at least a portion of said user input; and
subsequently receiving a second message delegating actuation of at least said portion to said particular agent.

9. A method for user input to a back-end application, comprising the steps of:
identifying synonyms in a synonyms database in dependence upon tokens in user input;
developing a natural language interpretation of said user input in response to said user input and said synonyms in combination; and
forwarding said interpretation toward said back-end application,
wherein said step of developing a natural language interpretation comprises the steps of a particular agent in a natural language interpreter:
receiving a first message that includes said user input;
returning a message claiming at least a portion of said user input;
subsequently receiving a second message delegating actuation of at least said portion to said particular agent;
and in response to said second message, extracting from said user input a target token sequence and an alternative token sequence,
said method further comprising the step of writing into said synonyms database said alternative token sequence in association with said target token sequence.

10. A method for user input to a back-end application, comprising the steps of:
identifying in user input a command to establish a synonym;
writing said synonym into a synonyms database;
identifying synonyms in said synonyms database in dependence upon tokens in user input;
developing a natural language interpretation of said user input in response to said user input and said synonyms in combination; and
forwarding said interpretation toward said back-end application.

11. A method according to claim 10, wherein synonym entries in said database each include a target token sequence and at least one alternative token sequence;
and wherein said step of identifying synonyms comprises the step of comparing tokens in said user input to said target token sequences.

12. A method according to claim 11, wherein said step of developing a natural language interpretation comprises the step of developing said interpretation in response to a combination of said user input and the alternative token sequences of the synonyms identified in said step of identifying synonyms.

13. A method according to claim 10, wherein said step of developing a natural language interpretation in response to said user input and said synonyms in combination, comprises the step of parsing said combination in a distributed manner.

14. A method according to claim 10, wherein said step of developing a natural language interpretation in response to said user input and said synonyms in combination, comprises the step of forwarding said combination into an agent network for interpretation.

15. A method according to claim 10, wherein said step of developing a natural language interpretation in response to said user input and said synonyms in combination, comprises the step of forwarding said combination to a plurality of agents arranged in a network, each of said agents having at least one interpretation policy having a policy condition and a policy action associated with the condition, each of said interpretation policies making a claim on at least part of a token sequence provided to the agent if the condition of the interpretation policy is satisfied, and executing the associated policy action in response to determination that the claim is at least part of a winning claim.

16. A method according to claim 15, wherein a particular one of said agents has a particular interpretation policy having a policy condition that refers to a downchain one of said agents, any claim made by said particular policy being dependent upon any claims made by said downchain agent.

17. A method according to claim 15, wherein a particular one of said agents has a particular interpretation policy having a particular policy condition that refers to a downchain one of said agents, said particular interpretation policy further having a particular policy action associated with said particular policy condition, wherein said particular policy action includes at least partial delegation to said downchain agent.

18. A method according to claim 10, wherein said step of developing a natural language interpretation comprises the steps of a particular agent in a natural language interpreter:

receiving a first message that includes said user input;

returning a message claiming at least a portion of said user input; and subsequently receiving a second message delegating actuation of at least said portion to said particular agent.

19. A method for user input to a back-end application, comprising the steps of:

identifying in user input a command to establish a synonym;

writing said synonym into a synonyms database;

identifying synonyms in said synonyms database in dependence upon tokens in user input;

developing a natural language interpretation of said user input in response to said user input and said synonyms in combination; and forwarding said interpretation toward said back-end application, wherein said step of developing a natural language interpretation comprises the step of preparing interpretation result commands in dependence upon satisfaction, in said combination, of one or more policy conditions which make reference to one or more keywords in a predetermined set of keywords.

20. A method for user input to a back-end application, comprising the steps of:

identifying in user input a command to establish a synonym;

writing said synonym into a synonyms database;

identifying synonyms in said synonyms database in dependence upon tokens in user input;

developing a natural language interpretation of said user input in response to said user input and said synonyms in combination; and forwarding said interpretation toward said back-end application, wherein said step of developing a natural language interpretation comprises the steps of a particular agent in a natural language interpreter:

receiving a first message that includes said user input;

returning a message claiming at least a portion of said user input;

subsequently receiving a second message delegating actuation of at least said portion to said particular agent; and in response to said second message, extracting from said user input a target token sequence and an alternative token sequence, said method further comprising the step of writing into said synonyms database said alternative token sequence in association with said target token sequence.

21. A system for user input to a back-end application, comprising:

means for identifying synonyms in a synonyms database in dependence upon tokens in user input;

means for developing a natural language interpretation of said user input in response to said user input and said synonyms in combination, including means for forwarding said combination to a plurality of agents arranged in a network; and means for forwarding said interpretation toward said back-end application.

22. A system according to claim 21, wherein synonym entries in said database each include a target token sequence and at least one alternative token sequence, wherein said means for identifying synonyms comprises means for comparing tokens in said user input to said target token sequences, and wherein said means for developing a natural language interpretation comprises means for developing said interpretation in response to a combination of said user input and the alternative token sequences of the synonyms identified in said means for identifying synonyms.

23. A system for user input to a back-end application, comprising:

means for identifying synonyms in a synonyms database in dependence upon tokens in user input;

means for developing a natural language interpretation of said user input in response to said user input and said synonyms in combination, including means for parsing said combination in a distributed manner; and means for forwarding said interpretation toward said back-end application.

24. A system for user input to a back-end application, comprising:

means for identifying synonyms in a synonyms database in dependence upon tokens in user input;

means for developing a natural language interpretation of said user input in response to said user input and said synonyms in combination; and means for forwarding said interpretation toward said back-end application, wherein said means for developing a natural language interpretation comprises a particular agent in a natural language interpreter, the particular agent including:

means for receiving a first message that includes said user input;

means for returning a message claiming at least a portion of said user input; and means for subsequently receiving a second message delegating actuation of at least said portion to said particular agent.

25. A system according to claim 24, further comprising means in said particular agent for, in response to said second message, extracting from said user input a target token sequence and an alternative token sequence, said system further comprising means for writing into said synonyms database said alternative token sequence in association with said target token sequence.

26. A system for user input to a back-end application, comprising:

means for identifying in user input a command to establish a synonym;

means for writing said synonym into a synonyms database;

means for identifying synonyms in said synonyms database in dependence upon tokens in user input;

means for developing a natural language interpretation of said user input in response to said user input and said synonyms in combination; and means for forwarding said interpretation toward said back-end application.

27. A system according to claim 26, wherein synonym entries in said database each include a target token sequence and at least one alternative token sequence, wherein said means for identifying synonyms comprises means for comparing tokens in said user input to said target token sequences, wherein said means for developing a natural language interpretation comprises means for developing said interpretation in response to a combination of said user input and the alternative token sequences of the synonyms identified by said means for identifying synonyms.

28. A system according to claim 26, wherein said means for developing a natural language interpretation comprises a particular agent in a natural language interpreter, the particular agent including:

means for receiving a first message that includes said user input;

means for returning a message claiming at least a portion of said user input;

means for subsequently receiving a second message delegating actuation of at least said portion to said particular agent; and means, in response to said second message, for extracting from said user input a target token sequence and an alternative token sequence, said system further comprising means for writing into said synonyms database said alternative token sequence in association with said target token sequence.

* * * * *